United States Patent
Sakai et al.

(10) Patent No.: US 6,735,740 B2
(45) Date of Patent: May 11, 2004

(54) DOCUMENT COMPOSITE IMAGE DISPLAY METHOD AND DEVICE UTILIZING CATEGORIZED PARTIAL IMAGES

(75) Inventors: Kenichiro Sakai, Kanagawa (JP); Tsugio Noda, Kanagawa (JP); Hirotaka Chiba, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/034,463

(22) Filed: Mar. 4, 1998

(65) Prior Publication Data

US 2002/0002570 A1 Jan. 3, 2002

(30) Foreign Application Priority Data

Sep. 8, 1997 (JP) .............................. 9-242293

(51) Int. Cl.[7] .......................... G06F 17/00; G06F 17/21; G06F 9/34
(52) U.S. Cl. ...................... 715/526; 715/517; 382/176
(58) Field of Search .................... 707/526, 517, 707/2, 3; 345/418, 431; 348/408; 358/450, 453; 382/260, 241, 176, 249, 170, 173; 715/526, 517

(56) References Cited

U.S. PATENT DOCUMENTS

| | | | | |
|---|---|---|---|---|
| 4,908,716 A | * | 3/1990 | Sakano ........................ | 358/453 |
| 5,339,108 A | * | 8/1994 | Coleman et al. ............ | 348/408 |
| 5,347,600 A | * | 9/1994 | Barnsley et al. ............ | 382/249 |
| 5,355,443 A | * | 10/1994 | Kim et al. ................... | 345/431 |
| 5,390,259 A | * | 2/1995 | Withgott et al. ............ | 382/173 |
| 5,608,543 A | * | 3/1997 | Tamagaki et al. ........... | 358/450 |
| 5,832,474 A | * | 11/1998 | Lopresti et al. ................ | 707/2 |
| 5,872,864 A | * | 2/1999 | Imade et al. ................. | 382/176 |
| 5,907,837 A | * | 5/1999 | Ferrel et al. .................... | 707/3 |
| 6,002,492 A | * | 12/1999 | Kamon et al. .............. | 382/241 |
| 6,005,679 A | * | 12/1999 | Haneda ........................ | 358/453 |
| 6,008,812 A | * | 12/1999 | Ueda et al. .................. | 345/418 |
| 6,018,597 A | * | 1/2000 | Maltsev et al. ............. | 382/260 |
| 6,161,114 A | * | 12/2000 | King et al. .................. | 707/517 |
| 6,181,818 B1 | * | 1/2001 | Sato et al. ................... | 382/170 |

FOREIGN PATENT DOCUMENTS

| | | |
|---|---|---|
| JP | 8-51545 | 2/1986 |
| JP | 3-14184 | 1/1991 |
| JP | 5-204740 | 8/1993 |
| JP | 05-328096 | 12/1993 |
| JP | 8-77377 | 3/1996 |
| JP | 08-255255 | 10/1996 |
| JP | 8-265556 | 10/1996 |
| JP | 8-305867 | 11/1996 |
| JP | 09-148938 | 6/1997 |

OTHER PUBLICATIONS

Marks, J. et al., Design galleries: a general approach to setting parameters for computer graphics and animation, ACM International Conference on Computer Graphics and Interactive Techniques, pp. 389–400, Aug. 1997.*

* cited by examiner

*Primary Examiner*—Sanjiv Shah
*Assistant Examiner*—William L. Bashore
(74) *Attorney, Agent, or Firm*—Westerman, Hattori, Daniels & Adrian, LLP

(57) ABSTRACT

One document image is divided according to attributes such as a character, a graphic, a table, etc., and the divided partial images are stored as one file. For example, each of the partial images is stored by being assigned with a priority, reduced in stages, and compressed with a compression method suitable for each of the attributes. If a user, etc. issues the instruction for making more of a desired portion visible and easy to view when he or she displays the document image, the user can freely make an easy-to-view display that the user desires according to the contents of the instruction. For example, the document image can be displayed by making an empty space between partial images smaller, a partial image with a higher priority can be displayed earlier, a specified partial image can be displayed larger, etc.

14 Claims, 33 Drawing Sheets

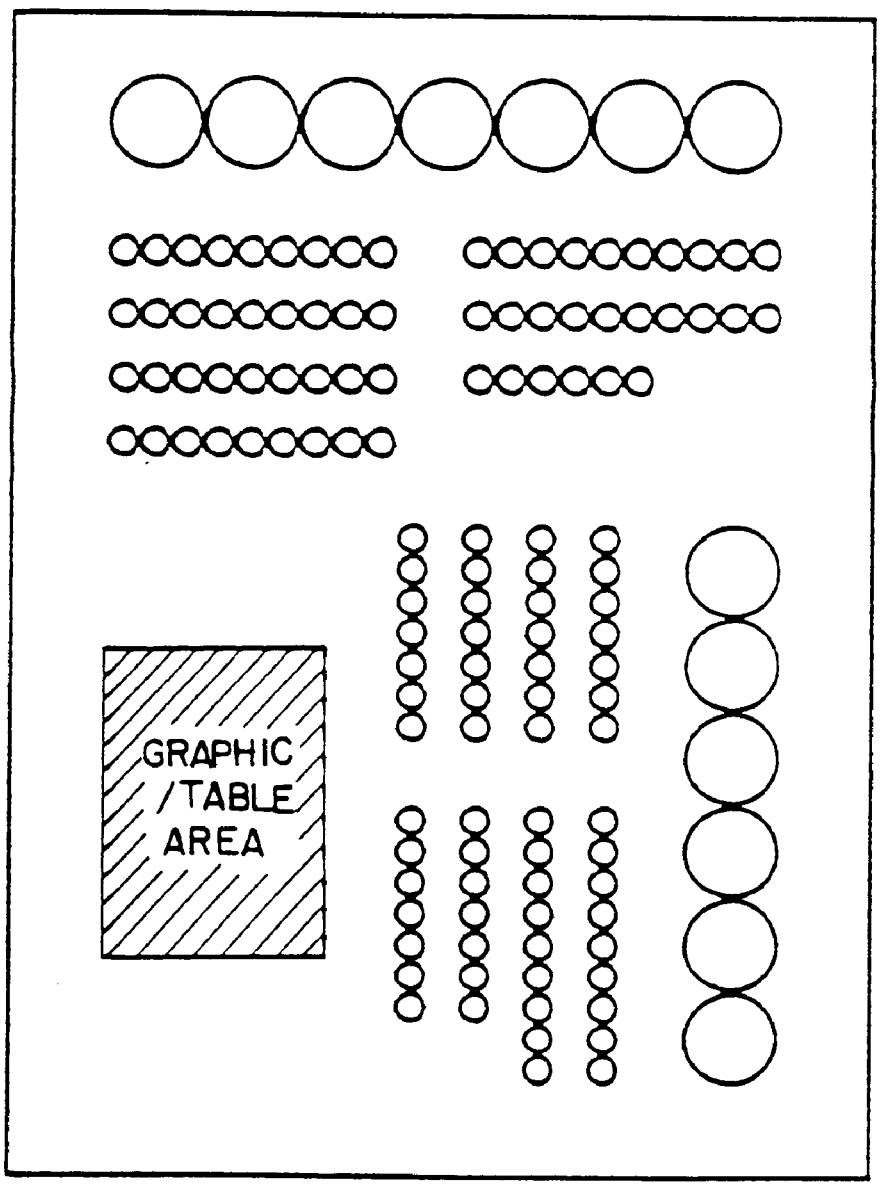
F I G. 6

R1 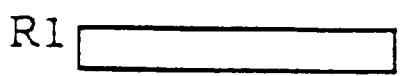
R2 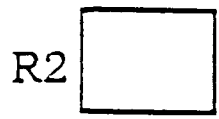
R3 
R4 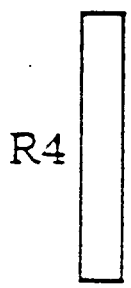
R5 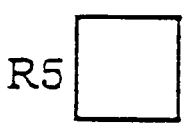
R6 
R7 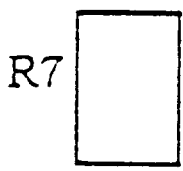
FIG. 8

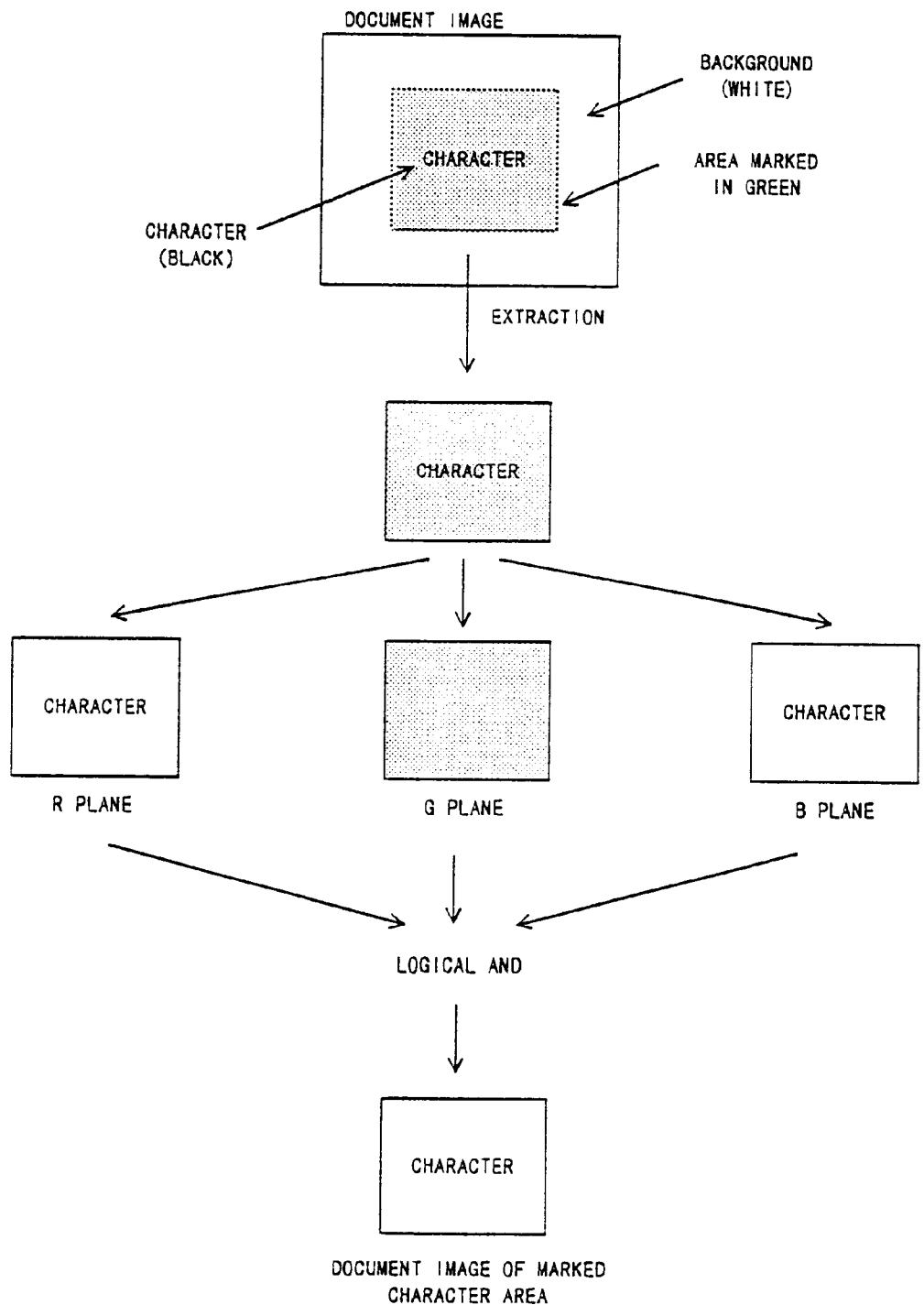
F I G. 2 8

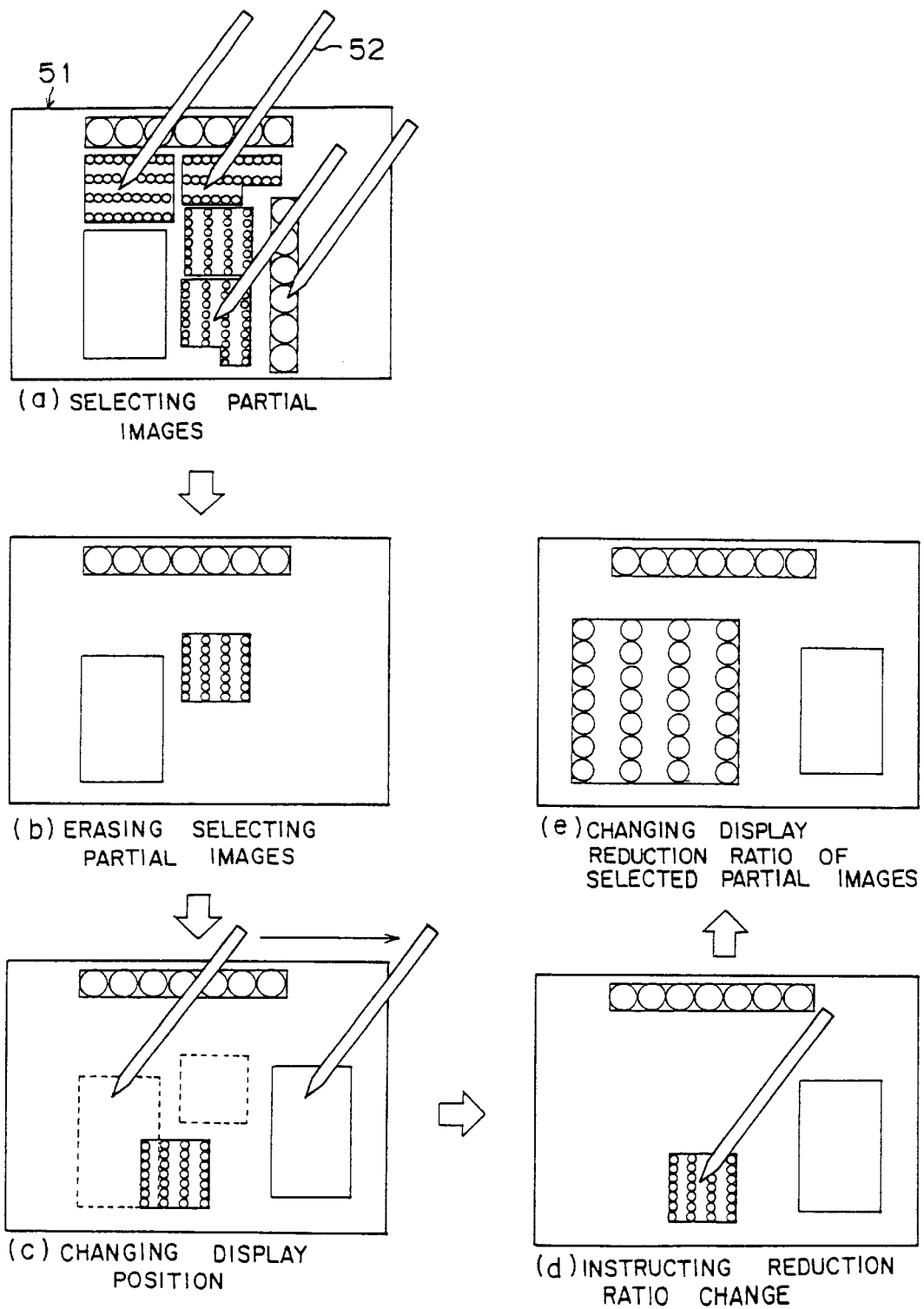
F I G. 31

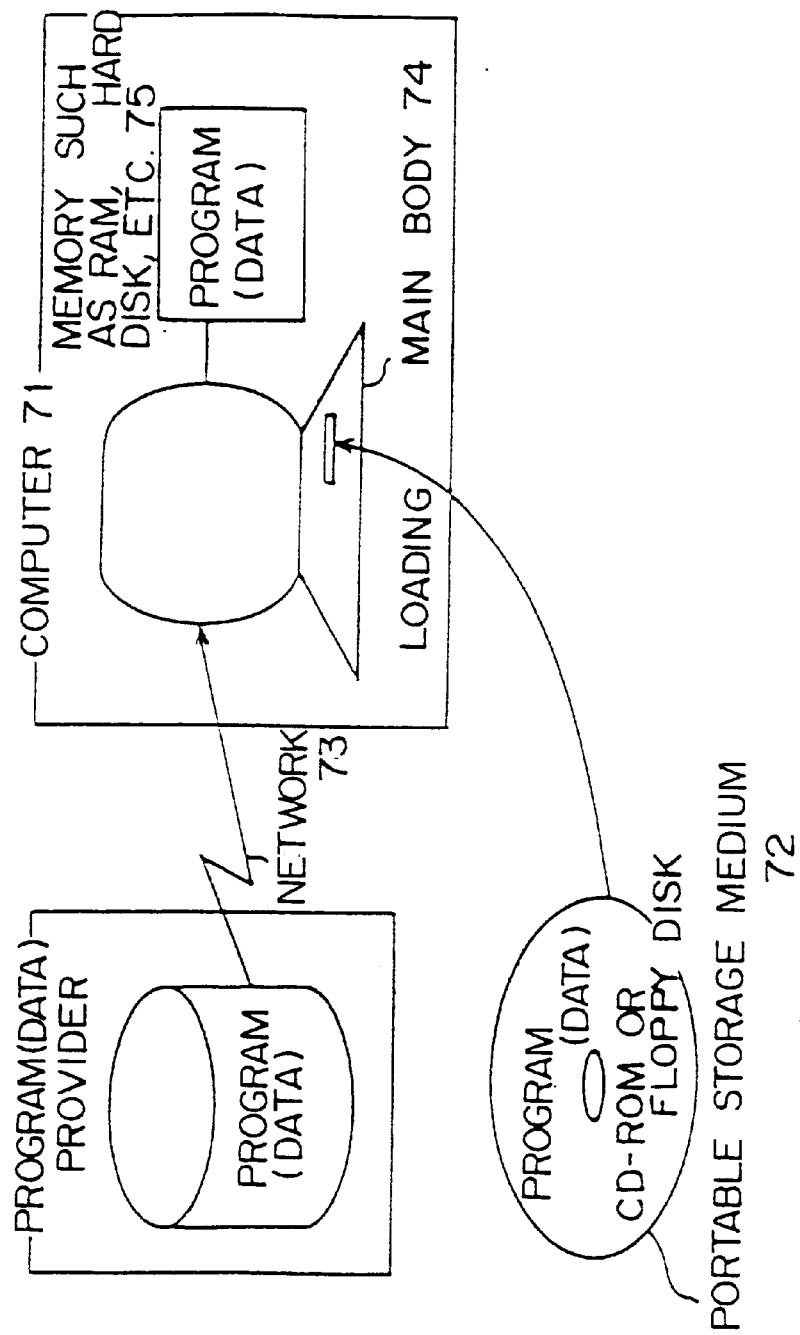
F I G. 33

DOCUMENT COMPOSITE IMAGE DISPLAY METHOD AND DEVICE UTILIZING CATEGORIZED PARTIAL IMAGES

BACKGROUND OF THE INVENTION

1. Field of the Invention

The present invention relates to a method for displaying a document image with a large number of pixels and at high resolution, which is captured from an image input device such as a scanner, etc., and more particularly to a method for displaying on a display screen whose number of pixels is smaller than that of an image to be displayed.

2. Description of the Related Art

In recent years, portable information devices such as a PDA (Personal Digital Assistant) have become popular. These portable information devices are compact in size and easy to carry, but their capabilities must be incorporated into small-sized bodies. That is, there are restrictions that their CPU performances and storage capacities are smaller and their display screens are of as small as some inches and the number of pixels to be displayed is small in comparison with generally used desktop PCs. For example, the number of pixels to be displayed by a desktop PC (the resolution of a desktop PC) is 1,024×768 pixels to 1,600×1,200 pixels, while the number of pixels to be displayed by a portable information device (the resolution of a portable information device) is approximately 320×240 to 640×480 pixels.

Meanwhile, a digital still camera of a small size with high performance, and a handy image scanner of a small size has become popular as image input devices. There is the demand for capturing an image in conjunction with a portable information device regardless of time and place. The number of pixels of a photo taken by a digital still camera is approximately 320×240 pixels to 640×480, and is suitable for capturing a natural image and a solid body such as a landscape, a man, etc. as a color image. Since an image scanner can scan an image at high resolution of 200 to 400 dpi (dots per inch: the number of pixels within the space of one inch), it is fit for capturing a document image. However, the number of pixels and the amount of data are large in contrast to the high resolution. For example, the number of pixels of an A4-sized document image captured at a 400 dpi is 3,400×4,600 pixels, and its data size is approximately 2 MB even if it is binarized.

When a document image is captured by connecting a handy scanner to a portable information device, there is the demand for reusing document image data such as transferring the image stored in the portable information device to a desktop PC and electronically filing the image, or performing character recognition (OCR: Optical Character Recognition) and converting the image into text data, etc. To satisfy this demand, the document image must be scanned and captured at high resolution.

However, because the number of pixels of a scanned document image is larger than that of a display screen of a portable information device, the entire document image cannot be displayed as it is. Assume that the display screen of the portable information device is at a resolution of 640×480 pixels, and the scanned image is at the above described resolution of 3,400×4,600 pixels (A4 size), the difference of the number of pixels between these two is 60 times. Accordingly, the document image must be converted by some means or other in order to be visible on a display screen.

With a conventional method for displaying a document image, if a document image whose number of pixels is large, and which is captured from an image input device such as a scanner, etc., is displayed on a display screen whose number of pixels that can be displayed is smaller than the number of pixels of the captured document image, the document image is reduced and displayed by adjusting the image to the width and height of a display area in order to match the number of pixels of the display area on the display screen, so that the entire image is displayed (Japanese Laid-open Patent Publication (TOKKAISHO) No. 62-186370). Assuming that the document image shown in FIG. 1 is displayed on the display screen, the width of the image is adjusted to the display area and the portion of the image is displayed as shown in FIG. 2, or the height of the image is reduced by adjusting to the display area and the image is displayed as shown in FIG. 3.

Additionally, with the conventional method for displaying a document image, if an entire document image is reduced and displayed, or if part of the document image is displayed, the document is displayed as the layout of the original document sets out. That is, even if the reducton ratio of the document image shown in FIG. 1 is different as shown in FIGS. 2 and 3, the document image is displayed according to the same layout of the original document.

Therefore, the conventional method for displaying a document image has the problem that characters become small and are difficult to read if the image is reduced in order to display the entire image, while the area for displaying the characters becomes smaller if the characters are displayed larger for ease of reading.

As the difference between the numbers of pixels of a document image and a display device becomes larger, or as the physical display area of the display device is smaller, the problem becomes bigger. Especially, this problem becomes more serious when the document image is displayed by a portable information device.

SUMMARY OF THE INVENTION

An object of the present invention is to provide a document image display method and a display device for displaying more of a desired portion of a document image whose number of pixels is large, and which is scanned at high resolution, on a display device whose number of pixels is smaller than that of the document image for ease of viewing.

The document image display method according to the present invention comprises: a partial image extracting step for structurizing a document image as a display target by dividing the image into areas according to attributes, and extracting the respective structurized areas as partial images; and an image storing step for storing the partial images extracted from one document in the above described partial image extracting step as one file.

The document image display method according to the present invention further comprises, for example, a data reading step for selecting and reading the partial images stored as one file in the above described partial image extracting step; and an image displaying step for independently displaying each partial image read in the data reading step.

Additionally, for example, a priority is assigned to the partial image in one document according to the attribute of the extracted partial image in the above described partial image extracting step; and the data of the priority assigned to the partial image together with the partial image are stored in the above described image storing step.

Furthermore, for example, the data of each partial image is reduced at a plurality of stages and stored.

With the document image display method according to the present invention, one document image is divided into a plurality of partial images, and each of the plurality of partial images is manipulated, so that the partial images can be displayed in various forms according to a user desire. For example, the partial images can be displayed in descending order of priorities assigned to the respective partial images; the partial image that a user desires to view can be first displayed by displaying an image reduced at a stage according to a priority; or an image reduced at a stage, which is easy to view, can be displayed.

BRIEF DESCRIPTION OF THE DRAWINGS

FIG. 6 is a schematic diagram exemplifying a document image captured by a scanner;

FIG. 8 is a schematic diagram showing partial images extracted from FIG. 7;

FIG. 28 is a schematic diagram explaining a first method for erasing a marking color, which is performed by a color erasing unit;

FIG. 31 exemplifies display operations;

FIG. 33 is a schematic diagram explaining loading of a program by a computer system as a document image display device.

DESCRIPTION OF THE PREFERRED EMBODIMENT

Figure 1:
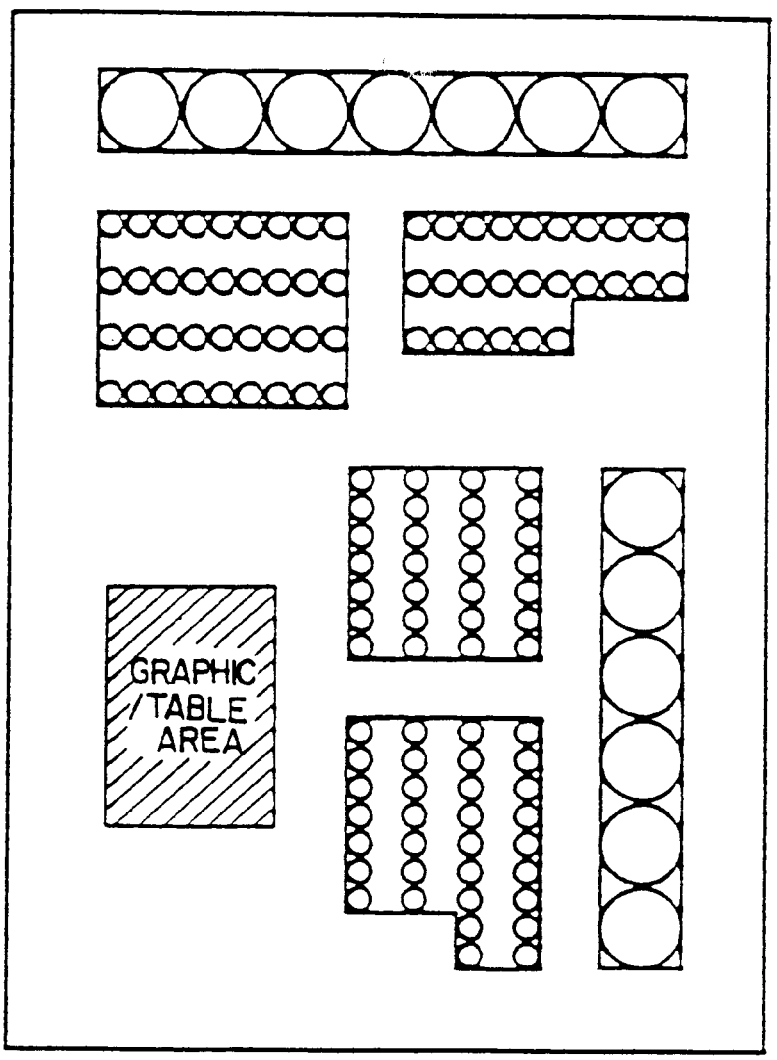
FIG. 1 is a schematic diagram exemplifying a document image for explaining a conventional image.
Figure 2:
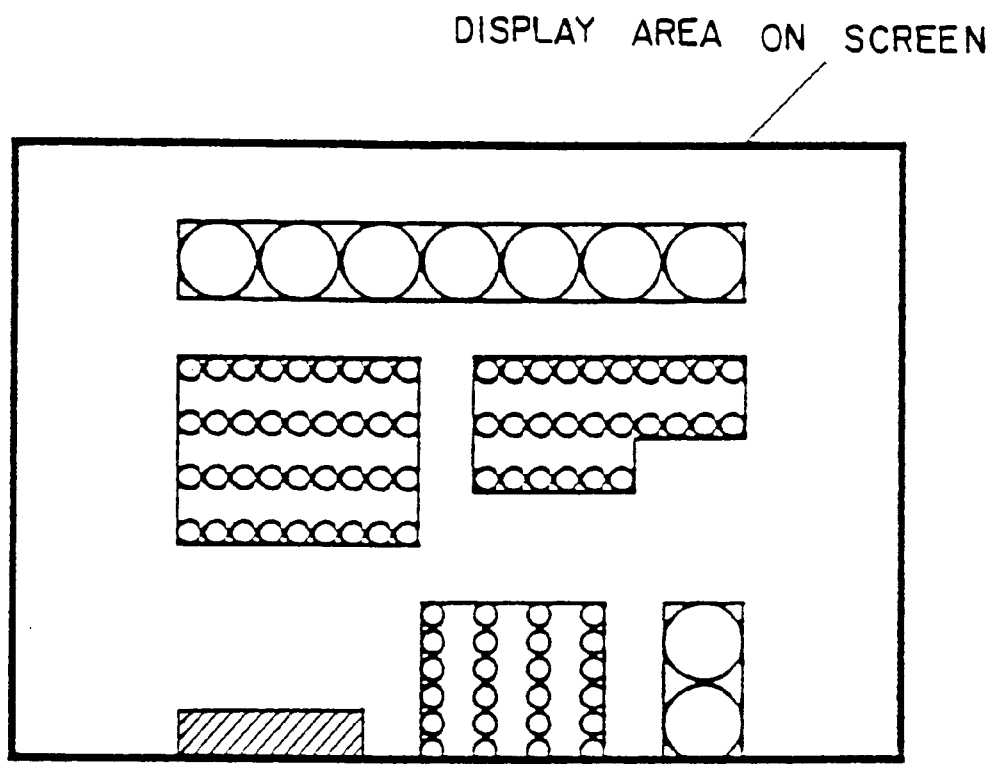
FIG. 2 is a schematic diagram exemplifying part of the document image shown in FIG. 1.
Figure 3:
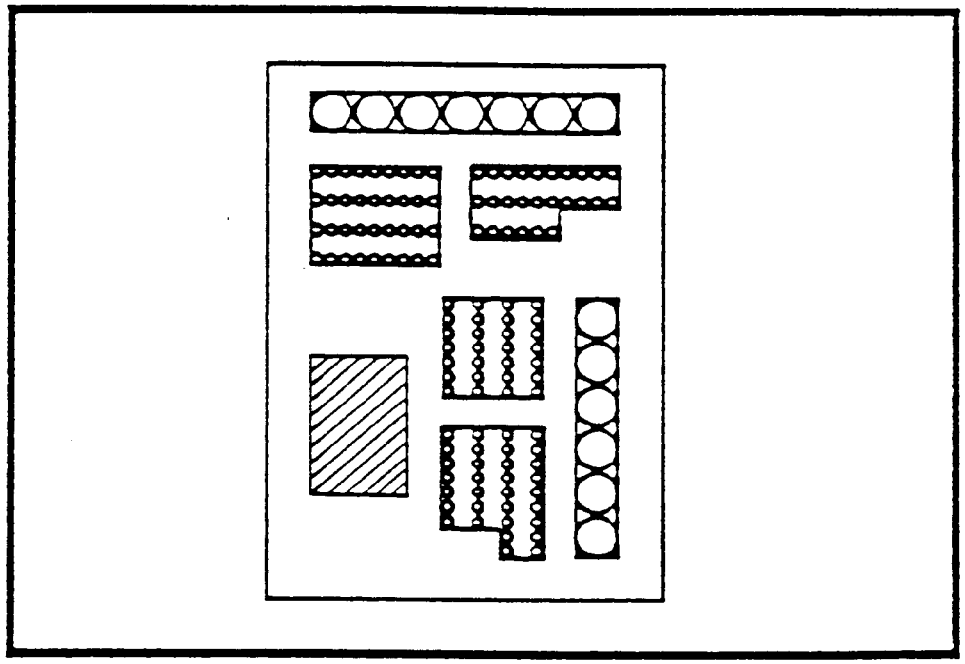
FIG. 3 is a schematic diagram showing the example in which the height of the image is reduced and displayed in order to fit a display area.
Figure 4:
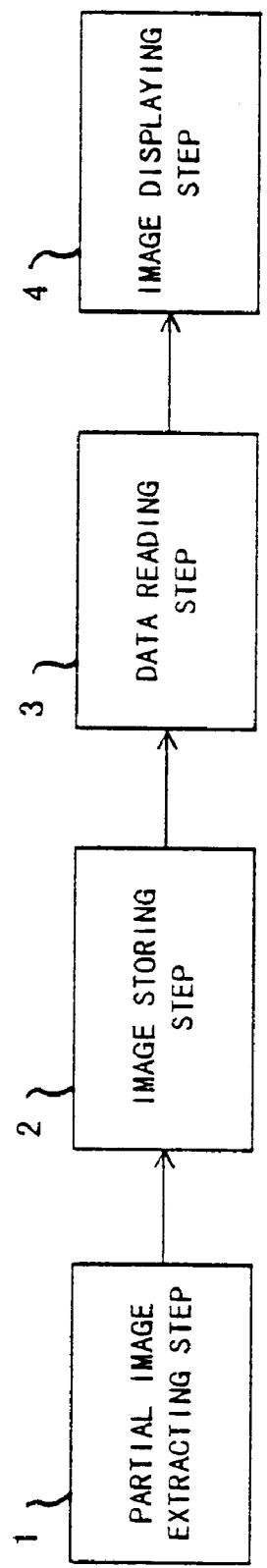
FIG. 4 is a block diagram showing the principle of the functions of a document image display method according to the present invention.

FIG. 4 is a block diagram showing the principle of the functions of a document image display method according to the present invention. In this figure, a partial image extracting step 1 structurizes a document image as a display target by dividing the document image into areas according to attributes, and extracts the respective structurized areas as partial images. An image storing step 2 stores the partial images extracted from one document in the partial image extracting step 1 as one file.

As described above, the present invention is characterized by that a document image is divided into area according to attributes, and structurized, and that an extracted partial image is stored as one file for each document. The structurization is intended to divide a document image into areas according to editable content attributes such as a character, a graphic, a table, etc. It is also referred to as layout recognition, or area division. With this structurization, the areas according tot he attributes such as a graphic, a table, a title, a text, etc., all of which are editable content, that is, the position, the size, and the attribute of a partial image can be obtained.

By storing these partial images as one file for each document, the data is not dispersed when the document image is displayed, thereby easily managing and reading the data.

The present invention may further comprise, for example, a data reading step 3, and an image displaying step 4, in addition to the above described partial image extracting step 1 and the image storing step 2. The data reading step 3 selects and reads the partial images stored as one file in the image storing step 2, and the image displaying step 4 independently displays the respective partial images read in the data reading step 3.

As described above, a document image is structurized and respective partial images can be independently displayed according to the present invention. Therefore, the respective partial images can be reduced and relocated, or relocated and displayed in order to reduce an empty (blank) space between partial images.

Additionally, data is compressed when an extracted partial image is stored, and the compressed partial image is decompressed when the data is read, so that more document images than those in the case where the data is uncompressed.

Furthermore, a user may assign priorities to extracted partial images in the order that the user desires to view. The user can display a partial image with higher priority earlier or larger, so that the user can view a desired portion earlier and the portion that the user desires becomes easier to view. For example, a partial image having a desired attribute may be displayed earlier or larger by assigning priorities according to the area attributes such as a title, a graphic, a table, etc.

Figure 5:
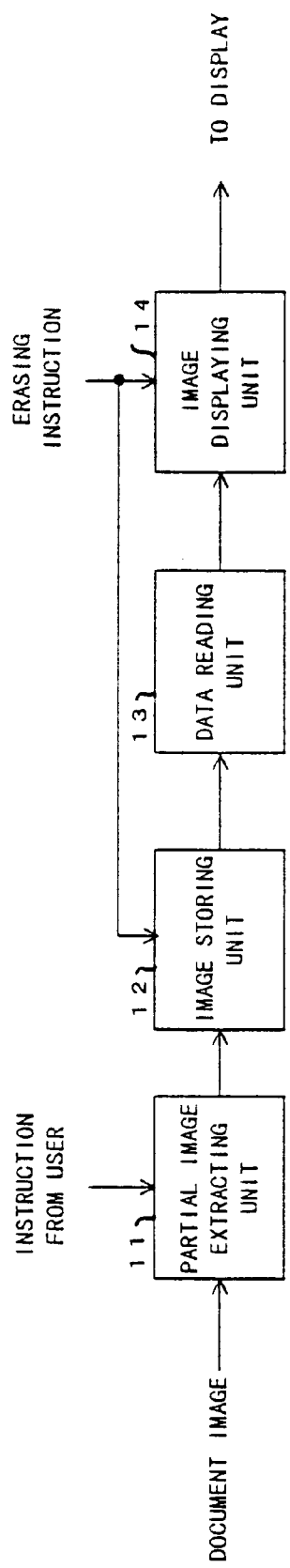
FIG. 5 is a block diagram showing the basic configuration of the functions of the document image display method according to the present invention.

FIG. 5 is a block diagram showing the basic configuration of the functions of the document image display method according to the present invention. In this figure, a partial image extracting unit 11 structurizes an input document image, and extracts respective divided areas as partial images. At this time, for example, only the area instructed by a user, or only the area having a predetermined attribute may be extracted. Additionally, also display priorities may be assigned to the partial images.

An image storing unit 12 stores the partial images extracted by the partial image extracting unit 11, and stores the information about the respective partial images such as the size of an image, a display priority, etc. together with the data of the partial image. A data reading unit 13 selects and reads the partial images stored in the image storing unit 12. An image displaying unit 14 performs control, for example, for relocating and displaying the read data. If the instruction for erasing a partial image is issued from a user, it is given to the image displaying unit 14 and the image storing unit 12 in order to erase a displayed partial image, and the stored data of the partial image.

Unlike a natural image, a document image normally has a meaning in each area. The respective areas structuring the document image can be classified according to the attributes such as a text area, a graphic/table area, etc., and the attributes such as a header indicating the source of the document, a title, a text, a footer indicating a page number of the source, etc. As is often the case, it is sufficient to be able to obtain only the information about one certain attribute in a document image when the document image is searched or its source is examined. Assuming that a user remembers only a graphic and the document relating to this graphic is searched, it is sufficient to search and display the areas having the attribute of that graphic. Or, assuming that a user remembers only a source, it is sufficient to search and display only a header area.

The structurization of a document image means that the document image is divided into areas according to the attributes such as a character, a graphic, a table, etc. It is also referred to as layout recognition or an area division. As the algorithms of the structurization, the following documents 1 and 2 are known.

Document 1:
  Japanese Laid-open Patent Publication (TOKKAIHEI)
    No. 5-225378
  Document Image Area Division System
Document 2:
  Japanese Laid-open Patent Publication (TOKKAIHEI)
    No. 1-130293
  Document Image Analysis Method Document 1 discloses the method for dividing a document image into a plurality of blocks, and recognizing areas using a numerical characteristic amount of each of the plurality of blocks, while Document 2 discloses the method for recognizing areas by using the distribution of the number of pixels in each row or in each column in a document image.

Here, any method may be applied to the structurization. The position, the size, and the attribute of each of the areas divided by the structurization, that is, a partial image can be obtained. The structurization of a document image and the extraction of a partial image will be explained below by referring to FIGS. 6 through 8.

Figure 7:
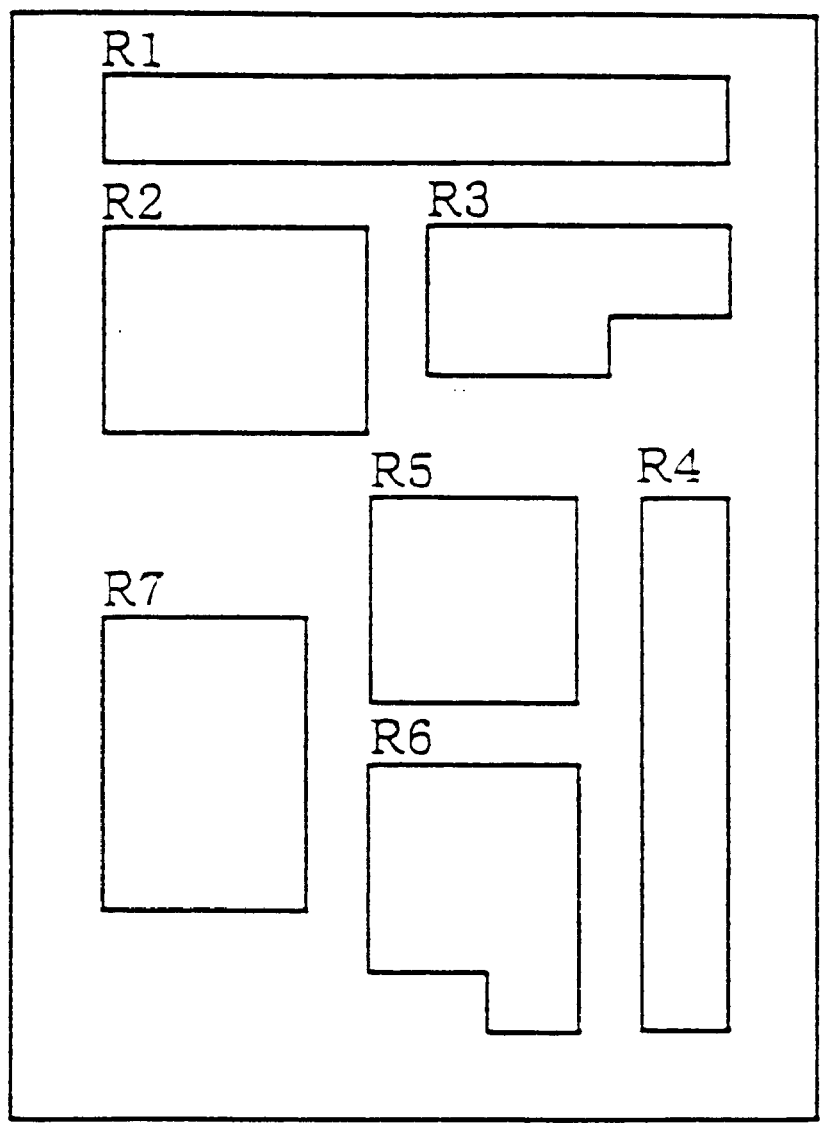
FIG. 7 is a schematic diagram showing a result of structurizing the document image shown in FIG. 6.

FIG. 6 exemplifies a document image which is scanned and captured by a scanner. The document image thus captured is provided to the partial image extracting unit 11 shown in FIG. 5. FIG. 7 shows the result of structurizing the document image shown in FIG. 6. In this example, R1 through R6, and R7 are respectively assumed to be character areas and a graphic or table area. Additionally, R1 is assumed to be the title of the contents of R2 and R3, while R4 is assumed to be the title of the contents of R5 and R6.

FIG. 8 shows partial images extracted by the partial image extracting unit 11. These partial images are stored by the image storing unit 12 as one file for each document, as will be described later.

Figure 9:
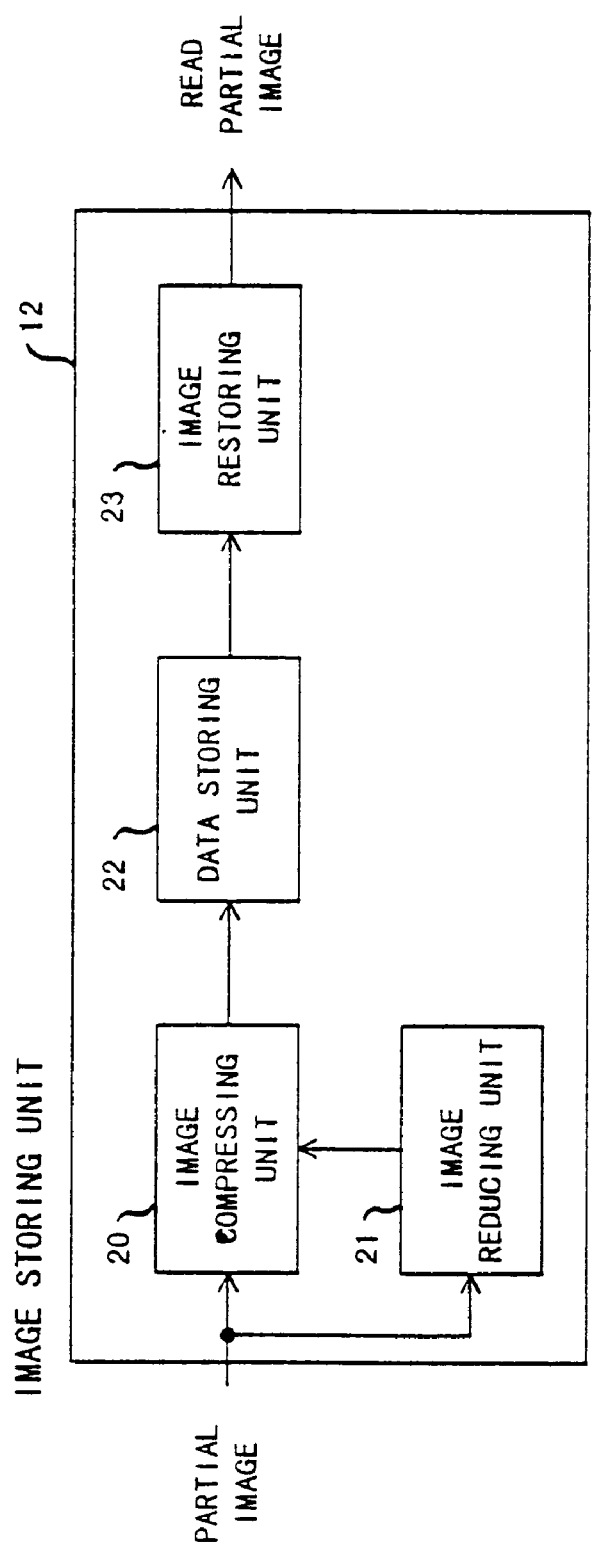
FIG. 9 is a block diagram exemplifying the configuration of the functions of an image storing unit.

Provided next is the explanation about compression of image data in the image storing unit 12 shown in FIG. 5. FIG. 9 is a block diagram showing the details of the functions of the image storing unit 12 shown in FIG. 9. In this figure, an image compressing unit 20 is intended to compress the data of a partial image extracted by the partial image extracting unit 11, and a data storing unit 22 is intended to store the compressed data. At this time, the partial image output from the partial image extracting unit 11 is reduced by an image reducing unit 21 depending on need. According to the result of the reduction, the image data is compressed by the image compressing unit 20. The compressed image data stored by the data storing unit 22 is restored by an image restoring unit 23, and provided to the data reading unit 13 as a read partial image.

Figure 10:
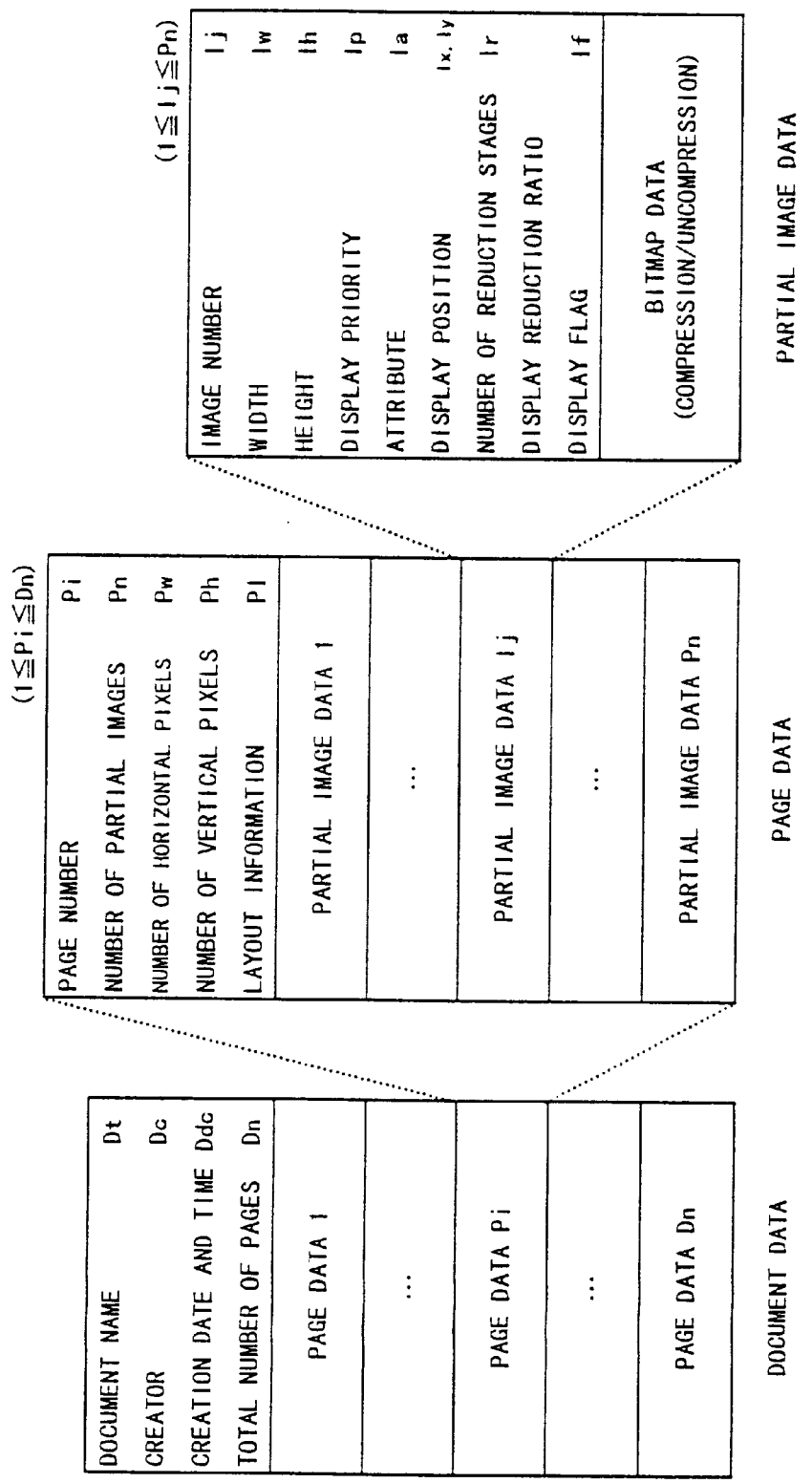
FIGS. 10A, 10B, and 10C exemplify the data structures of a document image.

Provided next is the explanation about the process flow from partial image extraction to partial image display according to the present invention by using a flowchart. Prior to providing this explanation, the structure of document image data according to the present invention is explained. FIGS. 10A, 10B, and 10C exemplify the structures of document image data. In these figures, document image data is explained by classifying the data into document data, page data, and partial image data.

The document data shown in FIG. 10A is composed of a header including document management information such as a document name, a creator, and page data (shown in FIG. 10B) which respectively correspond to a plurality of pages.

The page data shown in FIG. 10B is composed of a header including a page number, the number of partial images on a corresponding page, the numbers of horizontal and vertical pixels as the image size of the entire page, and the layout information indicating the arrangement of respective partial images on the page; and a plurality of pieces of partial image data (shown in FIG. 10C) on the page.

The partial image data shown in FIG. 10C is composed of an image number for uniquely identifying a partial image on the page, the numbers of vertical and horizontal pixels (size), display priorities, attributes such as a title, a graphic, a table, etc., a display position, the number of reduction stages indicating the number of stages at which reduction is performed, a reduction ratio used for a display, a display flag indicating existence/non-existence of a display, and bitmap data of a partial image. The bitmap data is stored as raster image data when data is not compressed, while it is stored as code data when the data is compressed.

Figure 11:
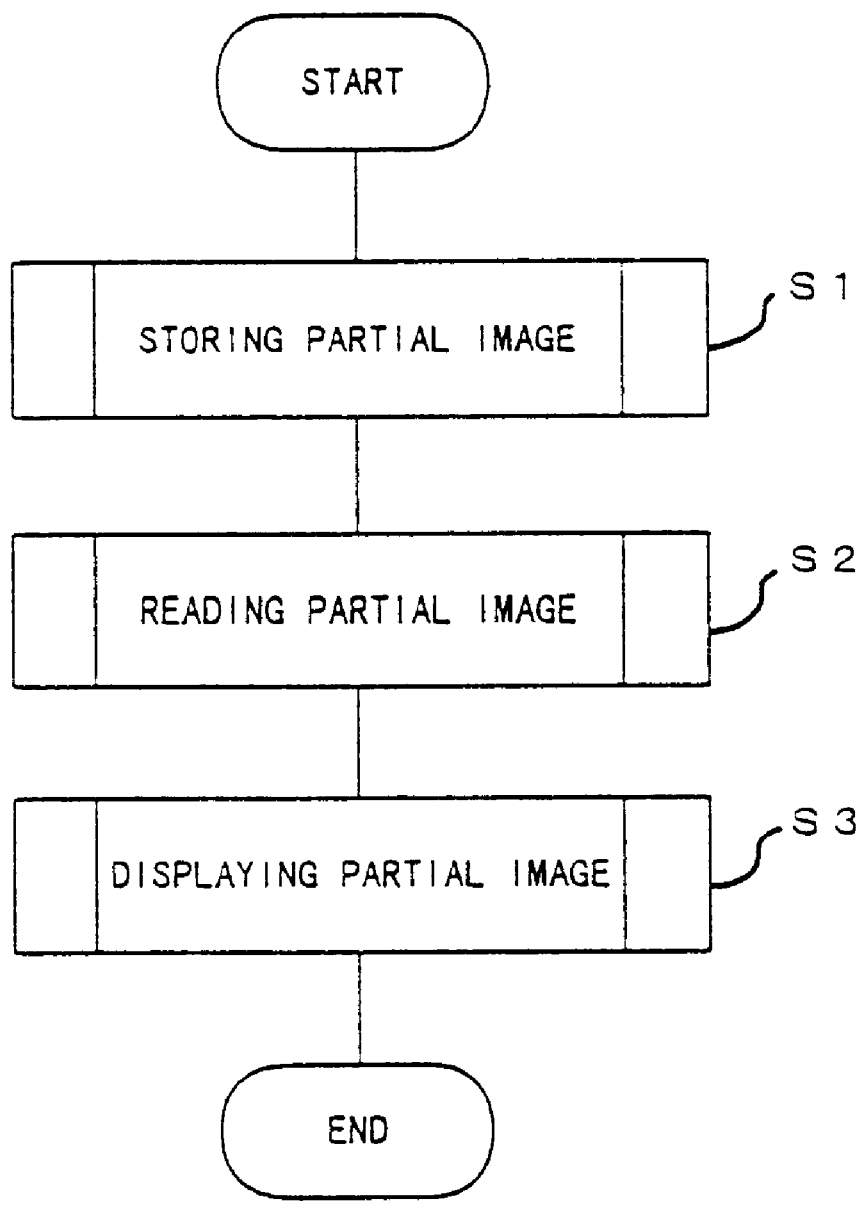
FIG. 11 is a flowchart showing the process flow from partial image extraction to partial image display.

FIG. 11 is a flowchart showing partial image extraction, that is, the process flow from partial image generation to partial image display. S1 is a process for extracting and storing a partial image; S2 is a process for selecting and reading the stored partial image; and S3 is a process for displaying the read partial image. The details of each of the processes will be described below.

Figure 12:
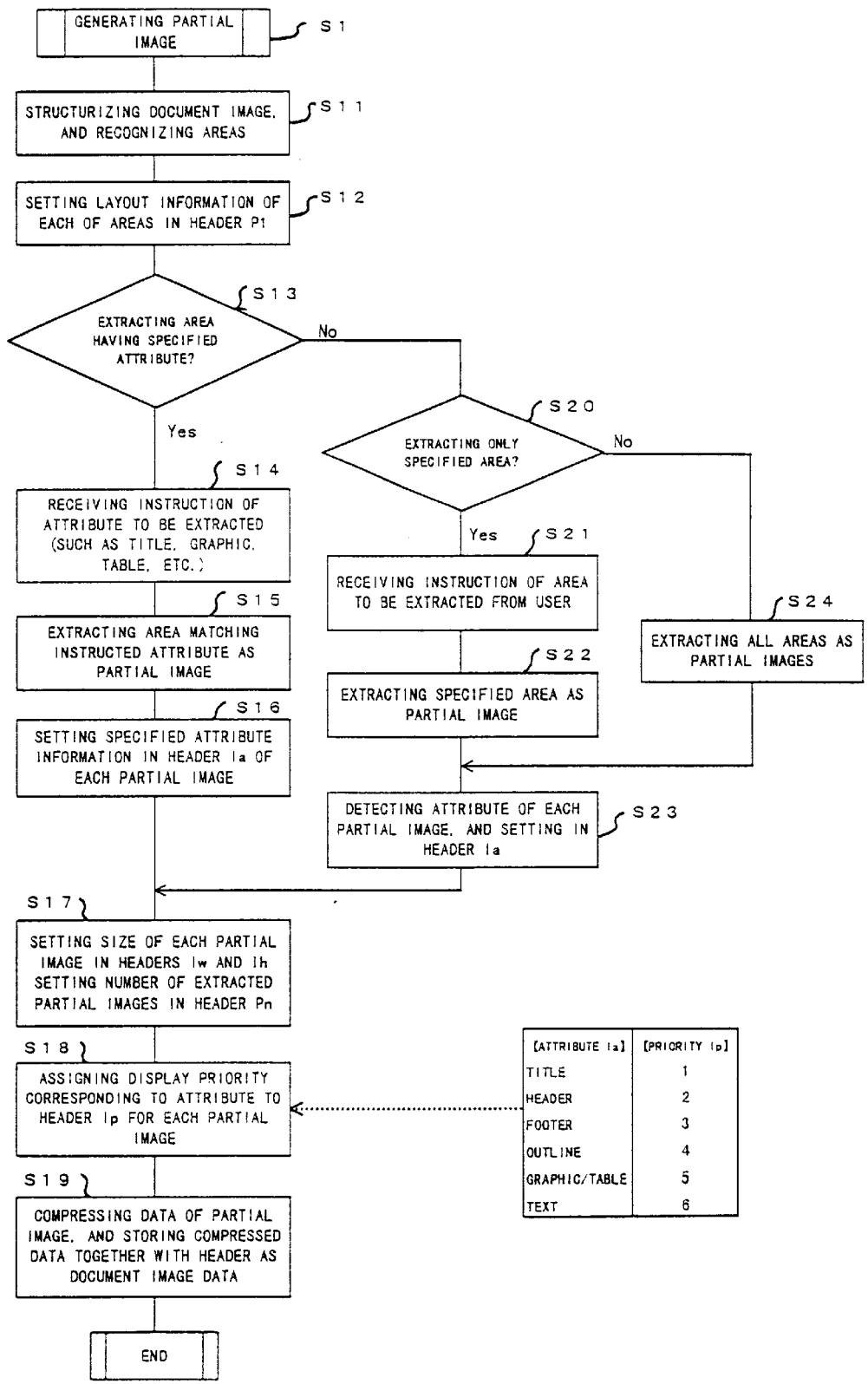
FIG. 12 is a flowchart showing the details of a process for storing the partial image shown in FIG. 11.

FIG. 12 is a flowchart showing the details of the process for storing a partial image in step S1, which is shown in FIG. 11. Once the process is started in this figure, structurization is performed by identifying the areas of a document image, and the attributes of the respective areas are recognized in step S11. In step S12, the layout information of the respective areas is set in a header P1 of the page data shown in FIG. 10B. Respective extracted partial images can be restored to the original document image like the layout of the original document based on the layout information, and displayed.

In step S13, it is determined whether or not to extract only the area having the attribute specified by a user. If the result of the determination is "YES", the attribute of the area to be extracted, such as a title, a graphic, a table, etc. is instructed from a user in step S14. Then, the attributes of the respective structurized areas are identified, and only the area having the attribute specified by the user is extracted as a partial image in step S15. The specified attribute is set as the attribute of the header of the partial image data shown in FIG. 10C for the respective partial images in step S16.

In step S17, the size of the respective partial images, that is, the number of vertical and horizontal pixels are set in the header of the partial image data, and the number of extracted partial images is set in the header of the page data. In step S18, a display priority is assigned to the header of the partial image data in correspondence with the attributes of the respective partial images. The display priorities corresponding to the attributes appear in the table at the side of step S18 in FIG. 12. The display priorities corresponding to the attributes may be arbitrarily decided, for example, by a user.

Lastly, the data of the partial image is compressed, the document image data is stored together with the header, and the process is terminated in step S19. At this time, the identification number and the display position of an image on the page are stored, and "ON" indicating a display is set and stored as a display flag in the header of the partial image data shown in FIG. 10C. If the partial image is reduced at a plurality of stages, also the number of reduction stages is stored. The page number and the numbers of vertical and horizontal pixels of the page are set and stored in the header of the page data. Note that the management information such as a document name, a creator, a creation date, the total number of pages, etc. of the document data are assumed to be set and stored prior to the process shown in FIG. 11.

If the result of the determination is "NO" in step S13, it is determined whether or not to extract not the area having the specified attribute, but only the particular area specified by the user in step S20. If the result of the determination made in step S20 is "YES", the instruction of the area to be extracted is received from the user in step S21. Only the instructed area is extracted as a partial image in step S22, and the attribute of each extracted partial image is detected and set in the header of the partial image data in step S23. Then, the process in and after S17 is performed.

If the result of the determination made in step S20 is "NO", all areas are extracted as partial images in step S24. The process in and after S23 is then performed.

With the above described process, the data of partial images included in one page and associated information are stored. For a document composed of a plurality of pages, the above described process is repeatedly performed.

Figure 13:
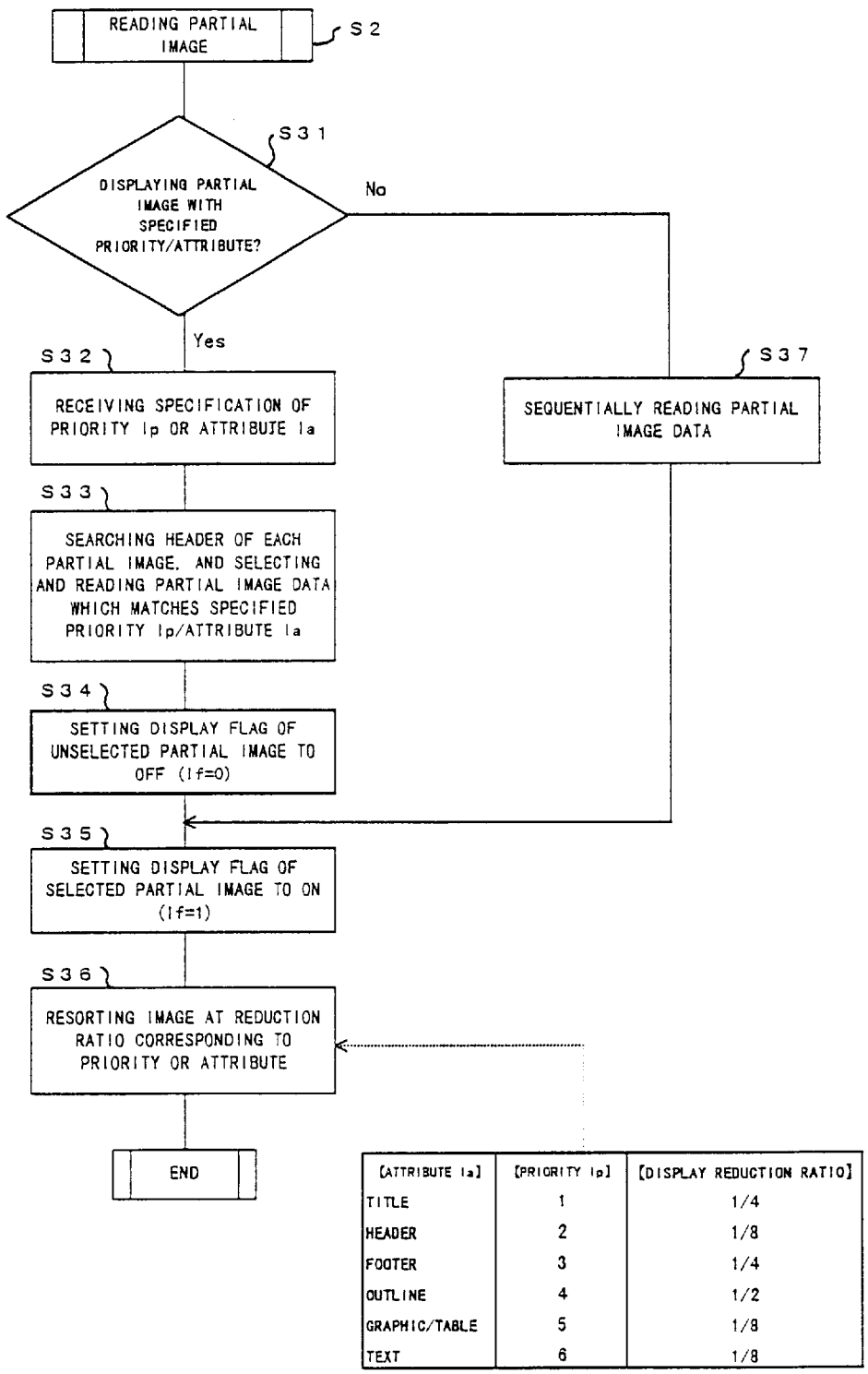
FIG. 13 is a flowchart showing the details of a process for reading a partial image.

FIG. 13 is a flowchart showing the details of step S2, that is, the process performed in step S2 of FIG. 11, that is, the process for reading a partial image. Once the process is started in this figure, it is determined whether or not to display only the partial image having a display priority assigned by a user, or a partial image having an attribute specified by the user in step S31. If the result of the determination made in step S31 is "YES", the specification of the display priority or attribute is received from the user. When the user assigns the priority, he or she assigns a priority 1 for displaying only the partial image whose priority is the highest, and assigns priorities 1 and 4 for displaying the partial images whose priorities are respectively 1 and 4. In the example table shown in FIG. 12, the priority 1 is a title image, and the priority 4 is an outline. When the attribute is specified, the specification is made, for example, the title, the outline, etc.

In step S33, the header of each partial image is searched, and the partial image data corresponding to the priority assigned by the user, or the attribute is selected and read out. In step S34, the display flag of an unselected partial image is set to "OFF". This is because the process for setting the display flag of the selected partial image to "ON" is performed in step S35.

If the result of the determination made in step S31 is "NO", that is, it is determined that only the partial image having the priority assigned by the user or the attribute specified by the user is not displayed, the partial image data is sequentially read out in step S37. The process then goes to step S35.

In step S35, the display flag of the selected partial image is set to "ON". As referred to in the explanation of step S19 of FIG. 12, the display flag of each partial image is set to "ON" when the partial image is extracted and stored. However, the display flag of the unselected partial image is set to "OFF" while partial images are repeatedly selected and displayed, as referred to in the explanation of step S34. Therefore, the process for setting the display flag of the selected partial image is set to "ON" in step S35.

Then, in step S36 the partial image is restored at a predetermined reduction ratio according to the display priority or the attribute, and the process for reading a partial image is completed. The display reduction ratios are prescribed in correspondence with the attributes or the priorities as the table shown at the side of step S36. The display reduction ratios are prescribed as the ratios to the original image: the reduction ratio of the title having the priority 1 is ¼; and the reduction ratio of the header having the priority 2 is ⅛. For example, the title having the priority 1 is restored to ¼ of the original size.

Figure 14:
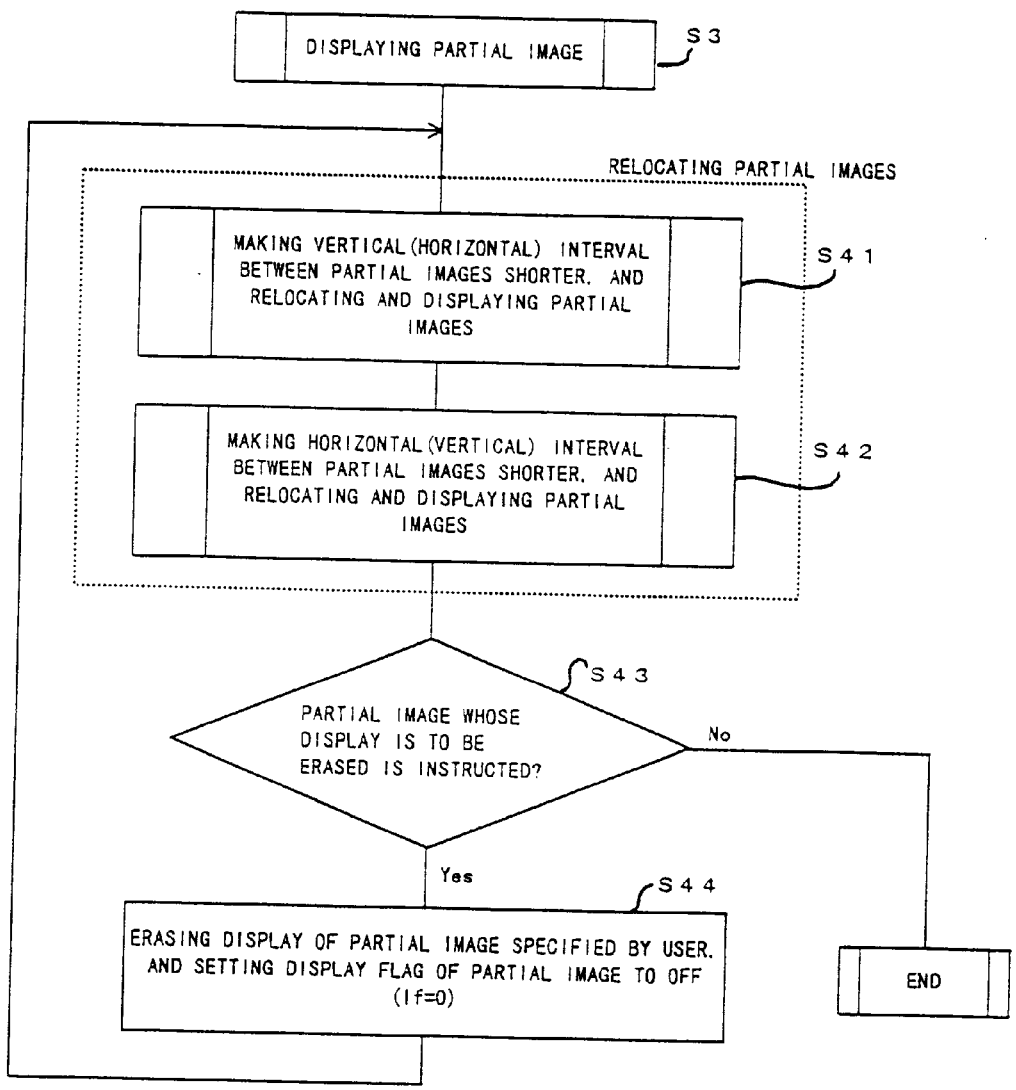
FIG. 14 is a flowchart showing the details of a process for displaying a partial image.

FIG. 14 is a flowchart showing the details of step S3 of FIG. 11, that is, the process for displaying a partial image. Once the process is started in this figure, partial images are relocated and displayed by making the interval between the partial images shorter in a vertical (or horizontal) direction as part of the process for relocating partial images in step S41. Then, the process for relocating and displaying partial images by making the interval between the partial images shorter in the horizontal (or vertical) direction is performed in step S42. These processes will be described later.

In step S43, it is then determined whether or not the partial image to be erased among the displayed partial images is specified by a user. If "NO", the process is terminated. If "YES", the partial image specified-by the user is erased, and the display flags of that partial image is set to "OFF" in step S44. The process in and after step S41 is repeatedly performed after that. Namely, if a certain partial image displayed on a screen is erased, the portion (area) where the partial image was displayed becomes empty. Therefore, partial images are again relocated.

Figure 15:
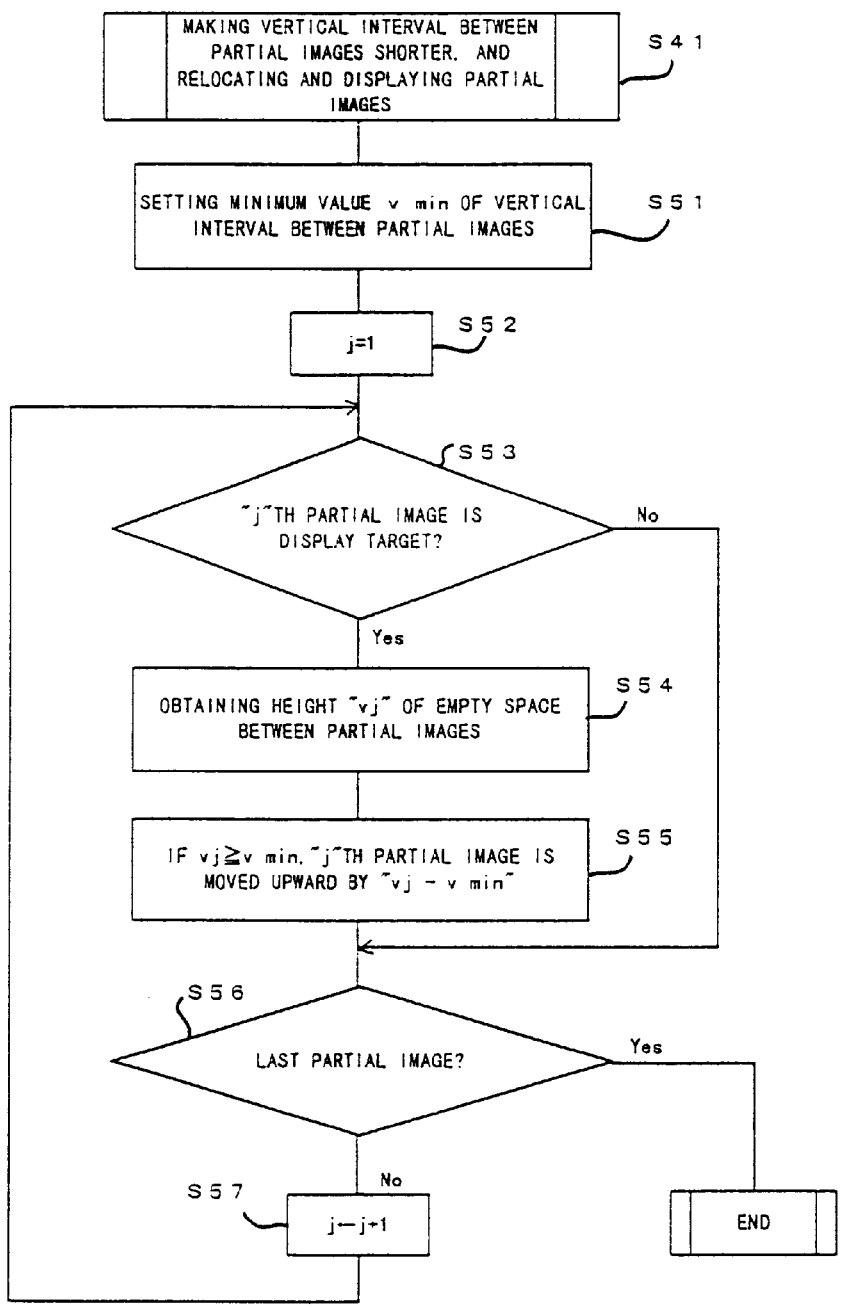
FIG. 15 is a flowchart showing the details of a process for displaying partial images by making vertical intervals shorter and relocating the partial images.

FIG. 15 is a flowchart showing the details of step S41 of FIG. 14, that is, the process for relocating and displaying partial images by making an interval between partial images shorter in a vertical direction. Once the process is started in this figure, a minimum value "v min" of the interval between partial images in the vertical direction is first set in step S51. This value can be arbitrarily set. It is possible to calculate and set, for example, the value for displaying all partial images exactly on a display screen when the partial images are relocated by making their intervals shorter in the vertical direction, according to the layout and the heights of the respective partial images on a page.

After "j" indicating the number of a partial image on the page is set to "1" in step S52, it is determined whether or not the "j" th partial image selected in step S53 is an image to be displayed according to the contents of the display flag. If the display flag is "ON", the vertical interval between the "j" th partial image and the partial image above this image, that is, the height of an empty space "vj" is obtained in step S54.

Figure 16:
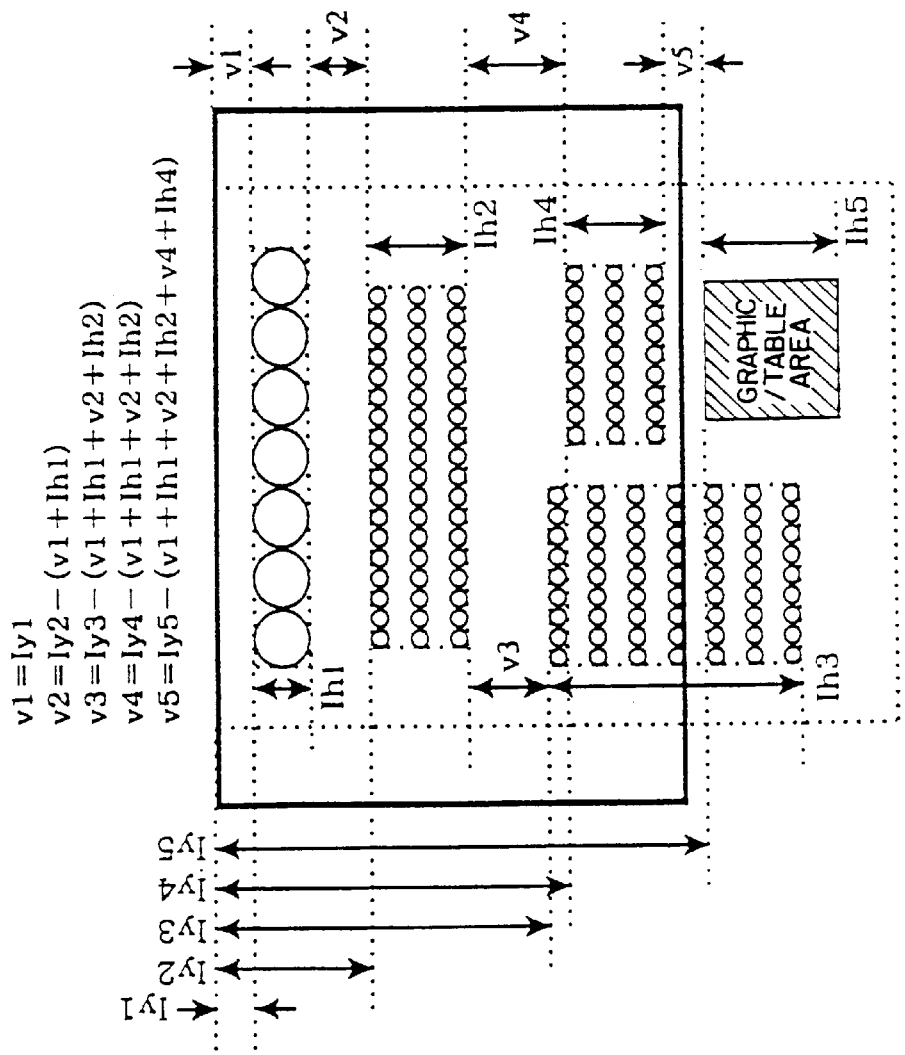
FIG. 16 is a schematic diagram explaining how to obtain a vertical interval between partial images, that is, the height of an empty space.

FIG. 16 is a schematic diagram explaining how to obtain the height of an empty space "vj". This figure shows the example in which five partial images are displayed without being relocated. Assume that the heights of the respective partial images are Ih1 through Ih5, and the vertical display positions starting from the top of the screen are Iy1 through Iy5. At this time, each of the intervals between the respective partial images is calculated by using any of the equations appearing at the top of FIG. 16.

In step S55, if the obtained height "vj " is equal to or longer than the minimum interval "v min", the "j" th partial image is moved upward by "vj-v min" in order to shorten an interval. If the "vj " is shorter than the "v min", the interval may be left unchanged, or may be extended up to the value of the "v min" for ease of viewing. If the "j" th partial image is not the image to be displayed in step S53, the processes in steps S54 and S55 are not performed and control is immediately transferred to step S56.

In step S56, it is determined whether or not the process is terminated for the last partial image on the page. If "YES", the process is terminated. If "NO", the value of the "YES", is incremented in step S57. Then, the process in and after S53 is repeatedly performed.

Figure 17:
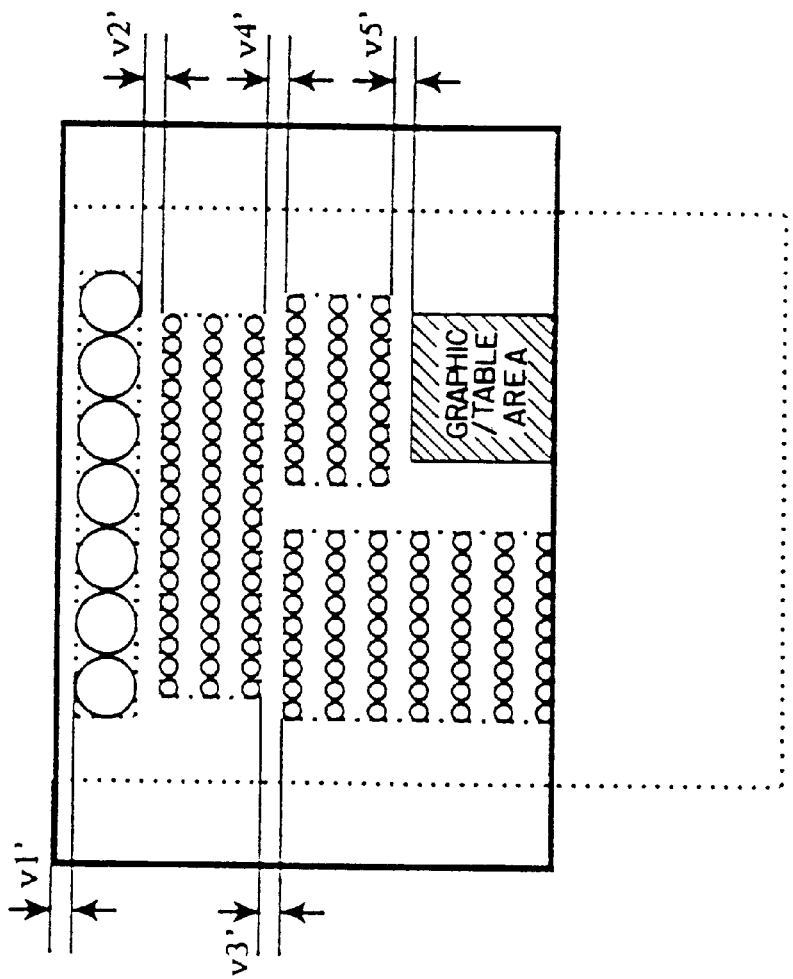
FIG. 17 is a schematic diagram showing the example in which the partial images shown in FIG. 16 are relocated.

FIG. 17 shows the example in which the vertical intervals of the respective partial images shown in FIG. 16 are made shorter and relocated. The intervals of the respective partial images are assumed to be v1' through v5'. The five partial images are arranged right on the screen.

Figure 18:
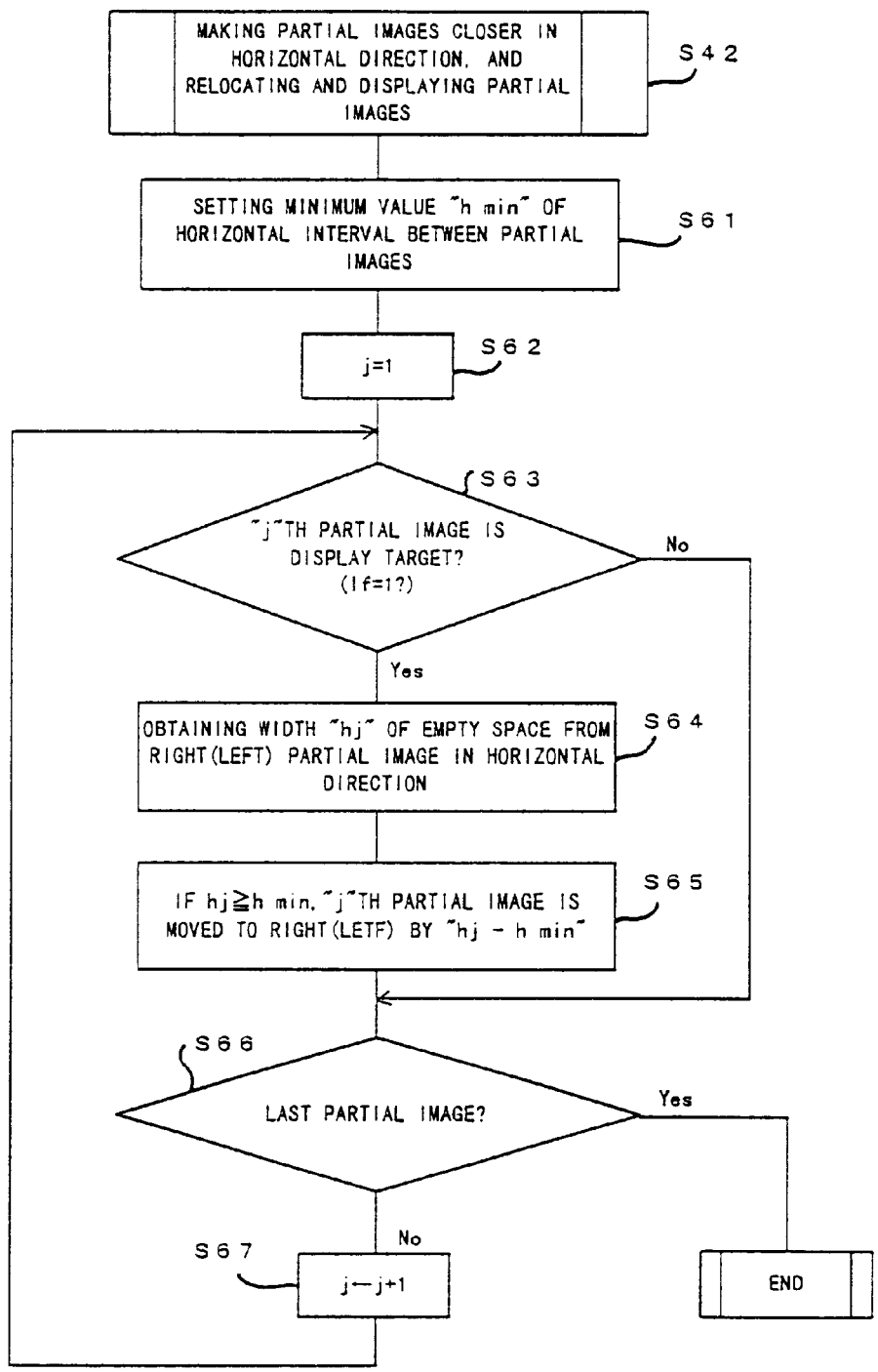
FIG. 18 is a flowchart showing the details of a process for displaying partial images by making horizontal intervals shorter and relocating the partial images.

FIG. 18 is a flowchart showing the details of step S42 shown in FIG. 14, that is, the process for relocating and displaying partial images by shortening their horizontal intervals. Since the process which is almost similar to that for shortening the vertical intervals in FIG. 15 is performed in this figure, its details are omitted here. In short, a minimum value "h min" of a horizontal interval is set in step S61. For example, if an interval "hj" between one partial image and its right image is longer than the minimum value "h min", the "j" th partial image is moved to the right by "hj-h min" in steps S64 and S65. If the interval on the left is shortened, the process in steps S64 and S65 is performed for the interval from the left partial image in a similar manner.

Figure 19:
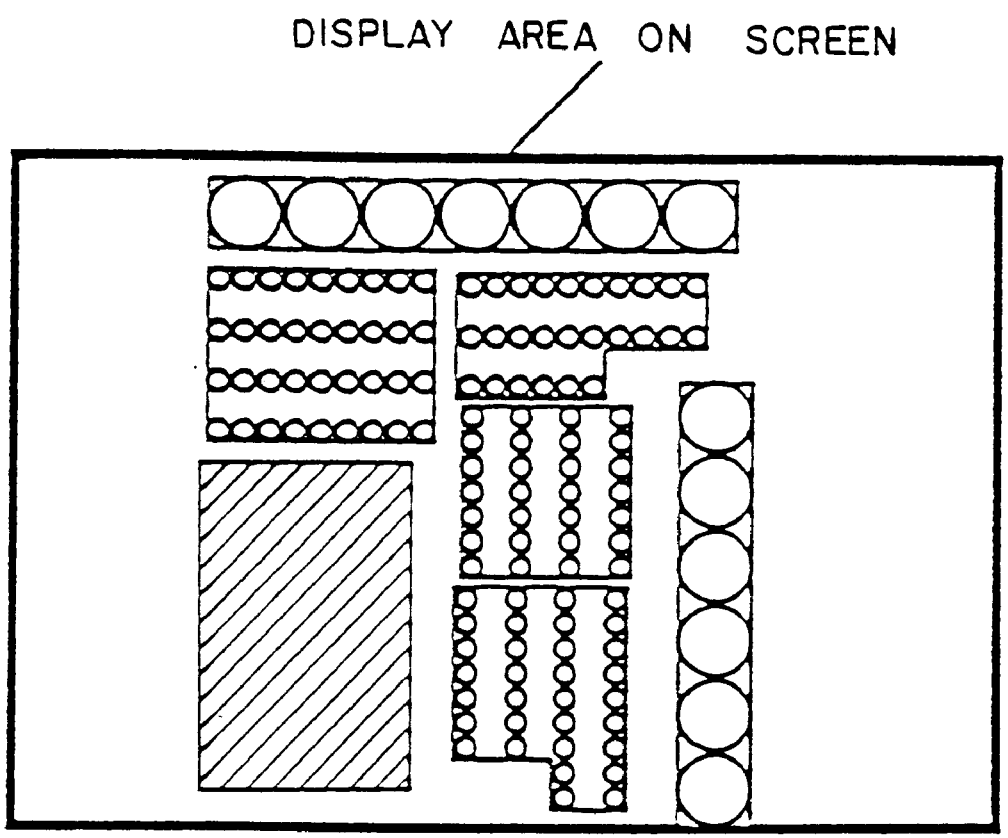
FIG. 19 is a schematic diagram exemplifying the result of relocating the partial images shown in FIG. 6.

FIG. 19 shows the example in which the document image shown in FIG. 6 is relocated and displayed with the above described series of processes.

With the above described series of processes, the partial images shown in FIG. 8 are extracted from the document image shown in FIG. 6, and are relocated by shortening the vertical and horizontal intervals, so that more pieces of information can be displayed at one time by the amount corresponding to the empty spaces between the respective partial images, which become smaller. As a result, the document image can be efficiently displayed.

Figure 20:
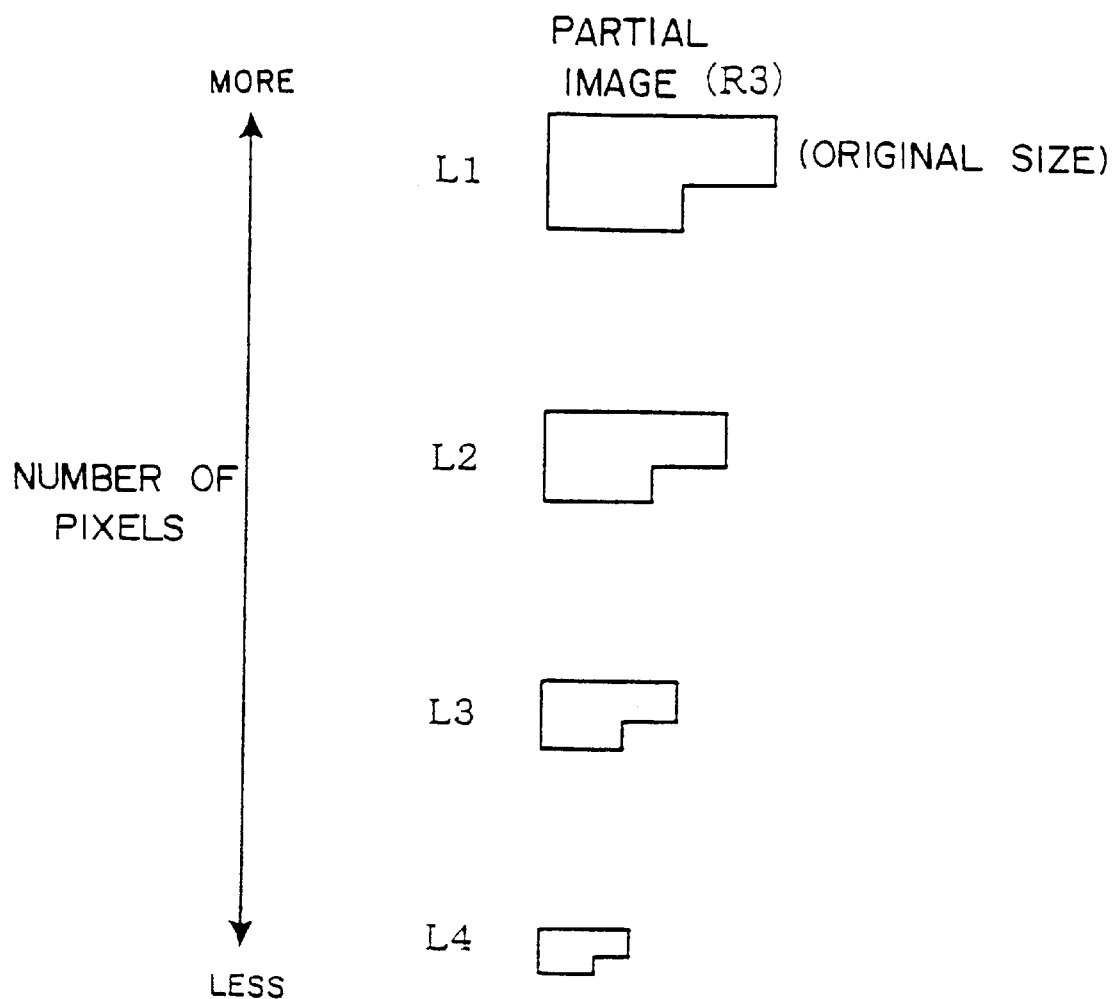
FIG. 20 is a schematic diagram showing the example in which reduced images of a partial image R3 shown in FIG. 8.
Figure 21:
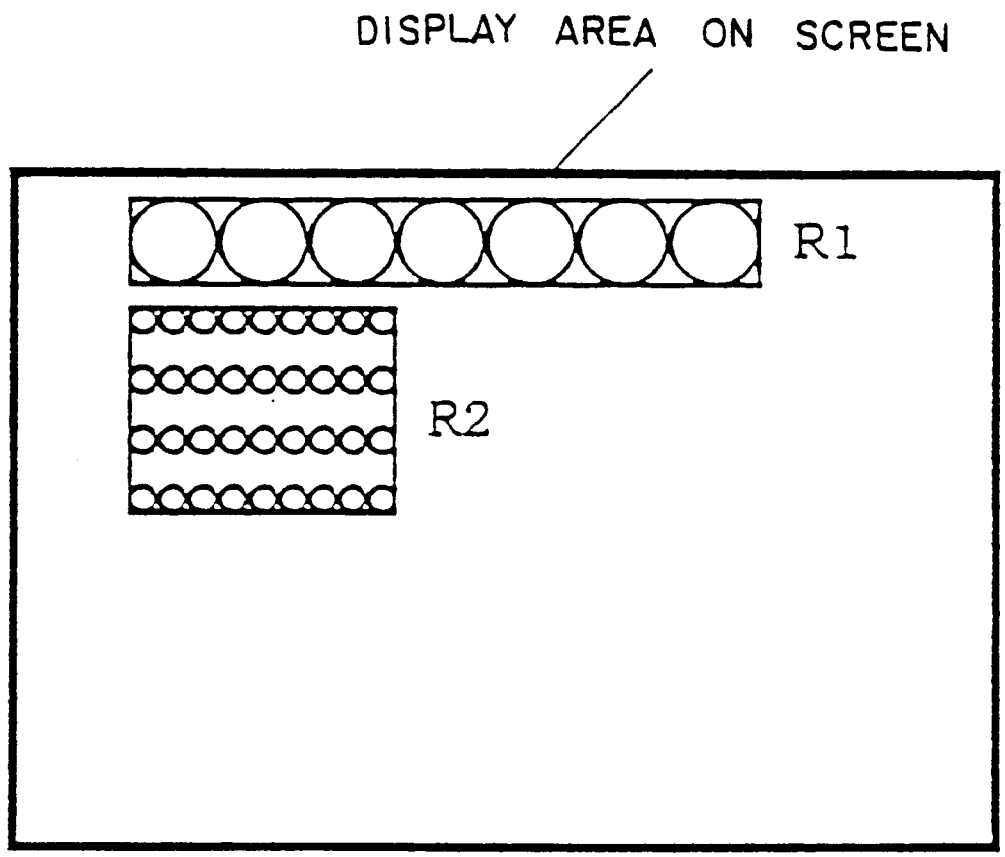
FIG. 21 is a schematic diagram showing the example in which two partial images are displayed at an identical reduction ratio.
Figure 22:
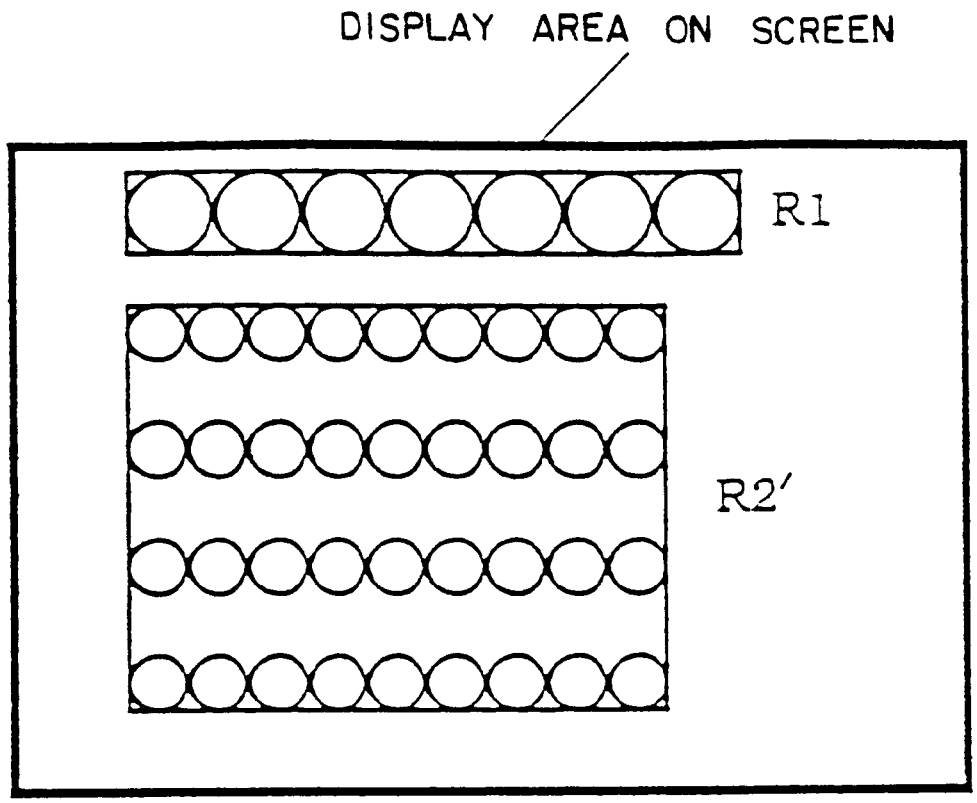
FIG. 22 is a schematic diagram showing the example in which the reduction ratios of the two partial images shown in FIG. 21 are changed according to display priorities.

Provided next is the explanation about reduction of an image and a display of a restored image, by referring to FIGS. 20 through 22. FIG. 20 is a schematic diagram showing the example in which an image is reduced by the image reducing unit 21. This figure shows the reduced images L1 through L4 obtained by reducing the partial image R3 shown in FIG. 8 at a plurality of stages.

The results of data compression performed by the image compressing unit 20 for the images reduced at the plurality of stages are stored in the data storing unit 22. Any data compression method may be applied to the staged partial images. If the differences between the respective reduced partial images are compressed, it can improve the compression ratio. One of such methods is: the smallest L4 is compressed as it is; the difference between L3 and L4 is compressed for L3; the difference between L2 and L3 is compressed for L2; and the difference between L1 and L2 is compressed for L1. Note that the reduction of such partial images is performed by sampling data. Therefore, even if only data of a reduced image is stored, the image cannot be enlarged when it is displayed.

To restore the images reduced at a plurality of stages, the image restoring unit 23 restores and outputs a partial image at an appropriately reduced stage depending on the size of a display area on a display screen. Assuming that the size suitable for a display is L3 among the partial images reduced at 4 stages, the partial image is restored not to the original size L1, but to the size L3. Consequently, the load on the process can be reduced in comparison with the case in which the partial is restored to the original size.

If display priorities are desired to be assigned to the partial images, a partial image with a higher priority may be restored to a partial image whose size is lager than that of a partial image with a lower priority. For example, if the partial images R1 and R2 shown in FIG. 8 are displayed at an identical reduction ratio, the characters in the area R2 become smaller, and difficult to read. By assigning a higher display priority to R2 than to R1, it becomes possible to make the entire image easy to view.

FIG. 21 shows the partial images R1 and 2 displayed at an identical reduction ratio. FIG. 22 shows the example in which the reduction ratio is changed according to a display priority, and the partial image R2 is displayed relatively larger than the original document image. For example, if the partial image is reduced at four stages as shown in FIG. 20, a partial image with a lower priority is restored to the size L4 and a partial image with a higher priority is restored to the size L2. As a result, the partial image R2 can be made easy to view as shown in FIG. 22.

Additionally, as described above, display priorities are assigned to respective extracted partial images according their attributes or a user instruction, and the images are stored, so that the partial images can be displayed in a descending order of the display priorities. Furthermore, the display priorities are corresponded to area attributes such as a title, a graphic, a table, etc., so that the partial image having a desired attribute can be displayed earlier.

Figure 23:
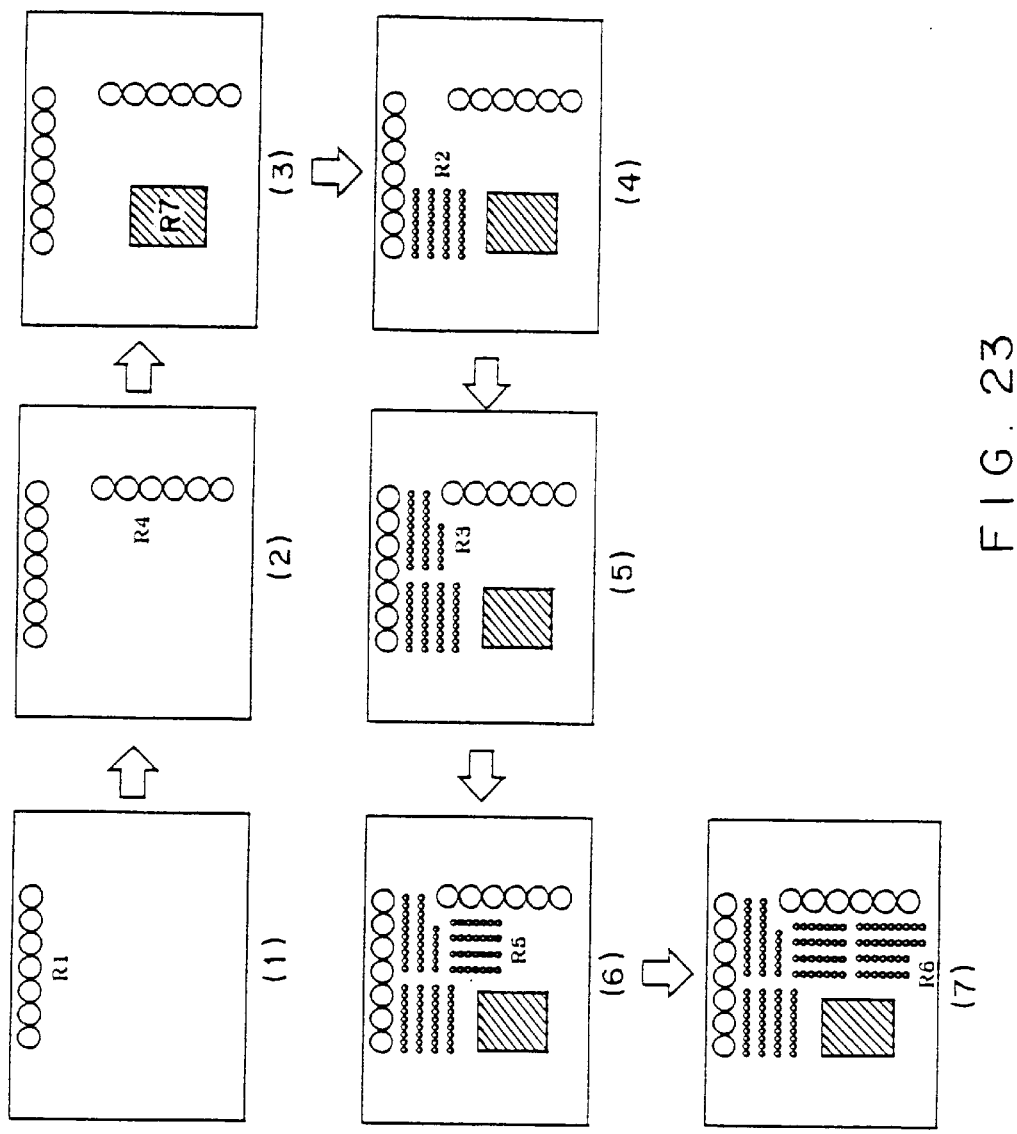
FIG. 23 is a schematic diagram explaining the example in which partial images are displayed by assigning resource priorities in correspondence with attributes.

FIG. 23 is a schematic diagram explaining such a display example. Assuming that the titles and the graphic take precedence in FIG. 7, that is, the titles R1 and R4, the graphic R7, the contents R2 and R3 of the title R1, and the contents R5 and R6 of the title R4 are sequentially assigned with display priorities, the partial images R1, R4, R7, R2, R3, R5, and R6 are displayed on a display screen in this order as shown in FIGS. 23(1) through 23(7).

Furthermore, if a document composed of a plurality of pages is searched, only the title or the header with the highest priority is selected and the corresponding partial image is displayed, so that the contents of the document is immediately known and its pages can be quickly turned over. Consequently, a search can be efficiently performed.

Even a partial image which is necessary at the time of capturing the data sometimes becomes unnecessary later. Or, because too many partial images are displayed, they are sometimes difficult to view. Therefore, a user can display a desired partial image by instructing a partial image to be erased among displayed partial images. Such an erase instruction is given to the image displaying unit 14 and the image storing unit 12. The image displaying unit 14 erases the instructed partial image from the screen, while the image storing unit 12 deletes the data of the instructed partial image from stored data.

Here, turning back to the explanation of each of the units of FIG. 5. When a partial image is extracted by the partial image extracting unit 11, a nonsense image such as a garbage image generated when a document image is scanned is not extracted as a partial image. Additionally, only the area instructed by a user is extracted, so that unnecessary data is deleted and a storage capacity required for storing images can be reduced.

Furthermore, because the characteristic of a partial image such as a distribution of pixel values may differ depending on its attribute, compression efficiency can be improved by applying the compression method suitable for each attribute. For example, to a character image, the MH (Modified Huffman) coding method as a representative one-dimensional coding method by using a correlation between pixels in one line, and the MMR (Modified Modified Read) coding method used for a G4 facsimile are applied. To a Japanese document image including Chinese characters, the following method disclosed by Document 3 as a patent application filed by the same applicant as that of the present invention is applied. To a simple graphical image, etc., the JBIG (Joint Bi-level Image Experts Group) coding method as a national standard of binary image coding is applied.

Figure 24:
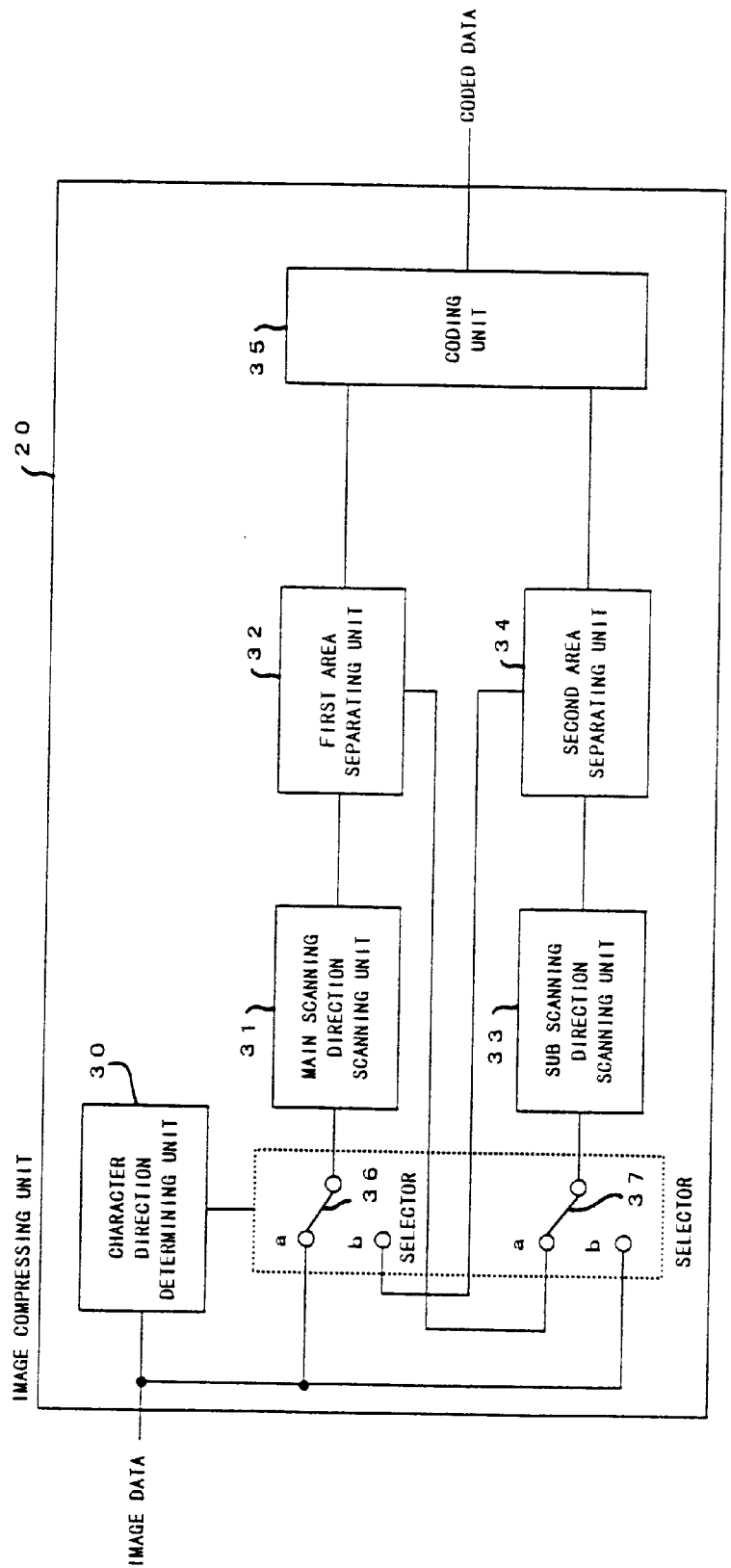
FIG. 24 is a block diagram No. 1 exemplifying the structure of an image compressing unit for switching a compression method depending on whether writing is either vertical or horizontal.
Figure 25:
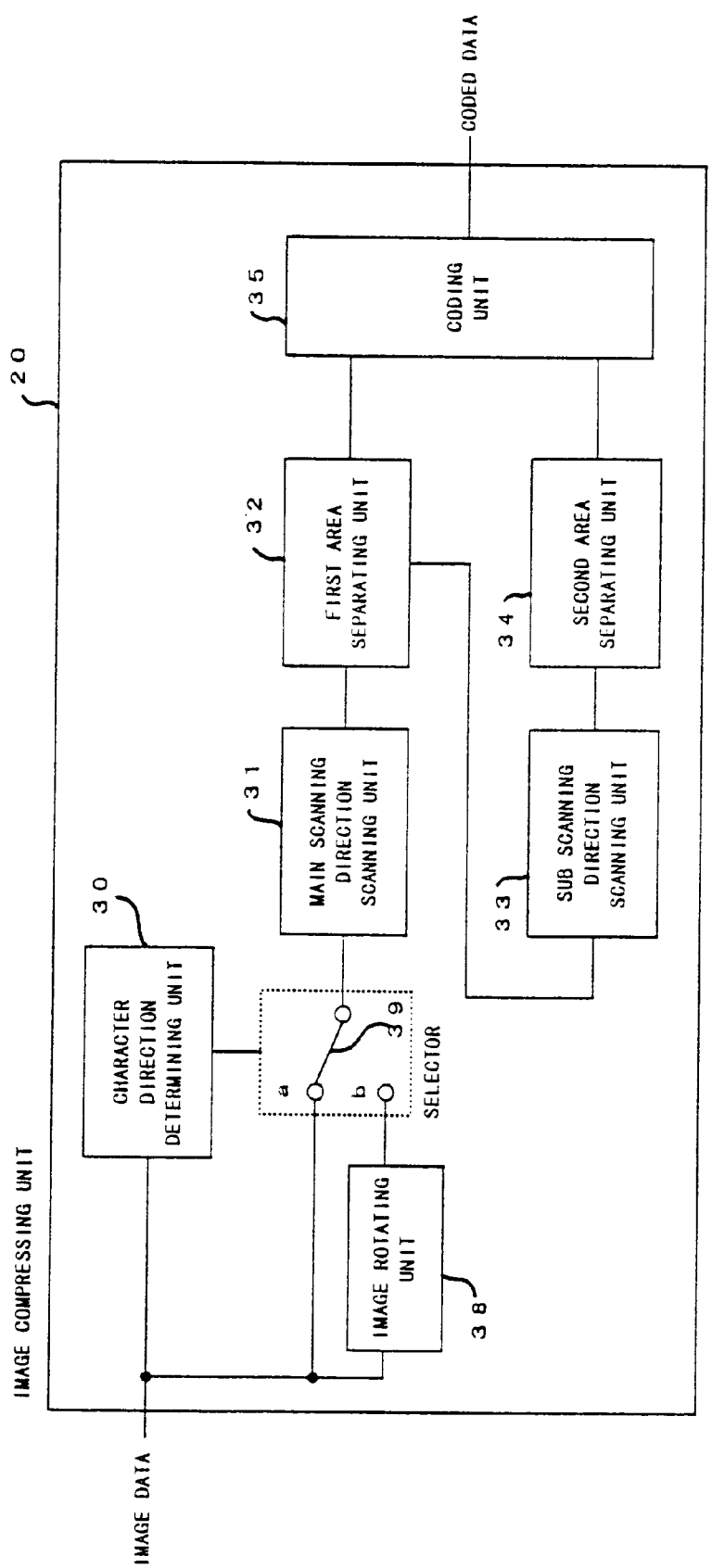
FIG. 25 is a block diagram No. 2 exemplifying the structure of the image compressing unit for switching a compression method depending on whether writing is either vertical or horizontal.

Document 3:
    Japanese Laid-open Patent Publication (TOKKAIHEI) No. 8-51545 Bitmap Data
    Compression Method and Device Thereof With the method disclosed by Document 3, for a Japanese document image including characters, etc. a compression method is switched for efficiently compressing an empty space between lines or between characters depending on whether characters are written either horizontally or vertically. As a result, more efficient compression can be performed. FIGS. 24 and 25 exemplify the configuration of an image compressing unit for switching a compression method depending on whether writing is either vertical or horizontal.

FIG. 24 is a block diagram (No. 1) showing the configuration of a first example of the image compressing unit for switching a compression method depending on whether writing is either vertical or horizontal. In this figure, the image compressing unit 20 is composed of a character direction determining unit 30, a main scanning direction scanning unit 31, a first area separating unit 32, a sub scanning direction scanning unit 33, a second area separating unit 34, a coding unit 35, and selectors 36 and 37, which will be described below. The character direction determining unit 30 determines whether characters included in image data to be input are written either vertically or horizontally. A main scanning direction scanning unit 31 scans a document, for example, in the horizontal direction of the document in 8-dot height units, and determines whether or not the scanned area includes black pixels. The first area separating unit 32 separates horizontally scanned areas into an area which includes black pixels and an area which does not include black pixels according to the result of scanning performed by the main scanning direction scanning unit 31. The sub scanning direction scanning unit 33 scans a document, for example, in 1-byte width units (the length in the horizontal direction), and determines whether or not the scanned area includes black pixels. The second area separating unit 34 separates the areas scanned by the sub scanning direction scanning unit 33 into an area which includes black pixels and an area which does not include black pixels among the areas scanned by the sub scanning direction scanning unit 33. The coding unit 35 encodes the outputs of the first and second area separating units 32 and 34.

Because the operations performed by the image compressing unit shown in FIG. 24 are explained in detail in Document 3, its operations are briefly explained here. If a document is written horizontally, both of the selectors 36 and 37 are switched to an "a" side according to the result of the determination made by the character direction determining unit 30. As described above, input image data is first scanned, for example, in the horizontal direction in 8-dot height units by the main scanning direction scanning unit 31, and it is determined whether or not the scanned area includes black pixels by the main scanning direction scanning unit 31. The result of the determination is provided to the first area separating unit 32, and the scanned areas are separated into the area which includes black pixels and the area which does not include black pixels. Here, assuming that the size (height) of the characters in the document is 52 dots, not only the empty spaces at the top and the bottom of the document, but also the empty spaces between lines are separated as the area which does not include black pixels by horizontally scanning the document in 8-dot height units. The information such as the one indicating up to where the uppermost empty space of the document is located, etc. are encoded by the coding unit 35 according to the result of the separation performed by the first area separating unit 32.

In the meantime, the area which includes black pixels and is separated by the first area separating unit 32 is transmitted to the sub scanning direction scanning unit 33. The sub scanning direction scanning unit 33 performs scanning in the direction perpendicular to that of the main scanning direction scanning unit 31. The sub scanning direction scanning unit 33 performs scanning, for example, in the vertical direction in 1-byte width units, and determines whether or not the area for which the scanning is performed once includes black pixels. The second area separating unit 34 separates the areas scanned by the sub scanning direction scanning unit 33 into an area which includes black pixels and an area which does not include black pixels. With this process, the empty spaces at the left and right ends of the document, and the empty spaces between characters are separated as the area which does not include black pixels. For example, the information indicating up to where the empty space on the left end of the document extends, and the area which includes black pixels, that is, the actual characters are encoded by the coding unit 35.

If the document is determined to be vertically written by the character direction determining unit 30 in the image compressing unit 20 shown in FIG. 24, the selectors 36 and 37 are switched to a "b" side. The input image data is vertically scanned by the sub scanning direction scanning unit 33. Then, the area which includes black pixels is provided from the second area separating unit 34 to the main scanning direction scanning unit 31, and the horizontal scanning is performed. The explanation about the details of this case is omitted here, because only the difference is that the scanning order is reverse.

FIG. 25 is a block diagram (No. 2) exemplifying the configuration of the image compressing unit 20 for switching a compression method depending on whether writing is either vertical or horizontal. The difference between FIG. 24 and this figure is explained below. If the document image is determined to be horizontally written, a selector 39 is switched to the "a" side, and the image data is compressed in a similar manner as in FIG. 24. If the document image is determined to be vertically written by the character direction determining unit 30, the selector 39 is switched to the "b" side. Then, the input image data is rotated by an image rotating unit 38 by 90 degrees, and is provided to the main scanning direction scanning unit 31. With this process, a vertically written input image is handled similarly to a horizontally written image, and compressed and encoded in a similar manner as in the above described case.

Provided next is the explanation about the example in which a marked area is extracted as a partial image. People sometimes mark a notable or important portion with a marking pen when reading a document printed on paper. A document colored with the marking pen in this way is scanned and captured as an image, and the marked portion is detected and extracted as a partial image, so that the notable portion can be extracted and displayed. With such a method, a notable portion can be specified with ease, and at the same time, the process for extracting a partial image can be automatically performed. As a result, a practical effect can be achieved.

Figure 26:
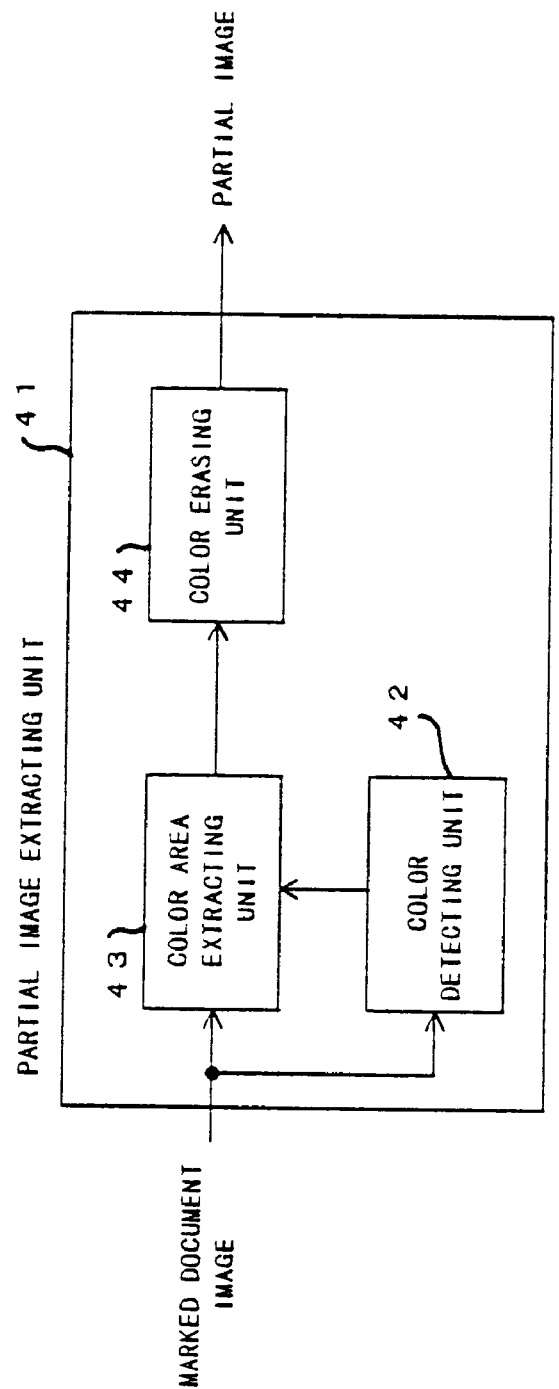
FIG. 26 is a block diagram exemplifying the configuration of the functions of a partial image extracting unit for extracting a marked portion as a partial image.

FIG. 26 is a block diagram exemplifying the configuration of the functions of a partial image extracting unit for extracting a marked portion as a partial image as described above. In this figure, a partial image extracting unit 41 is composed of a color detecting unit 42, a color area extracting unit 43, and a color erasing unit 44.

The color detecting unit 42 scans an input document image which is marked for each pixel, and detects a color to be detected, that is, the color of a marking pen such as the portion whose background is colored in green. The color area extracting unit 43 extracts the marked area detected by the color detecting unit 42, for example, the green area, from the document image. The color erasing unit 44 erases the marking color from the extracted image, and outputs the image as a partial image.

Figure 27:
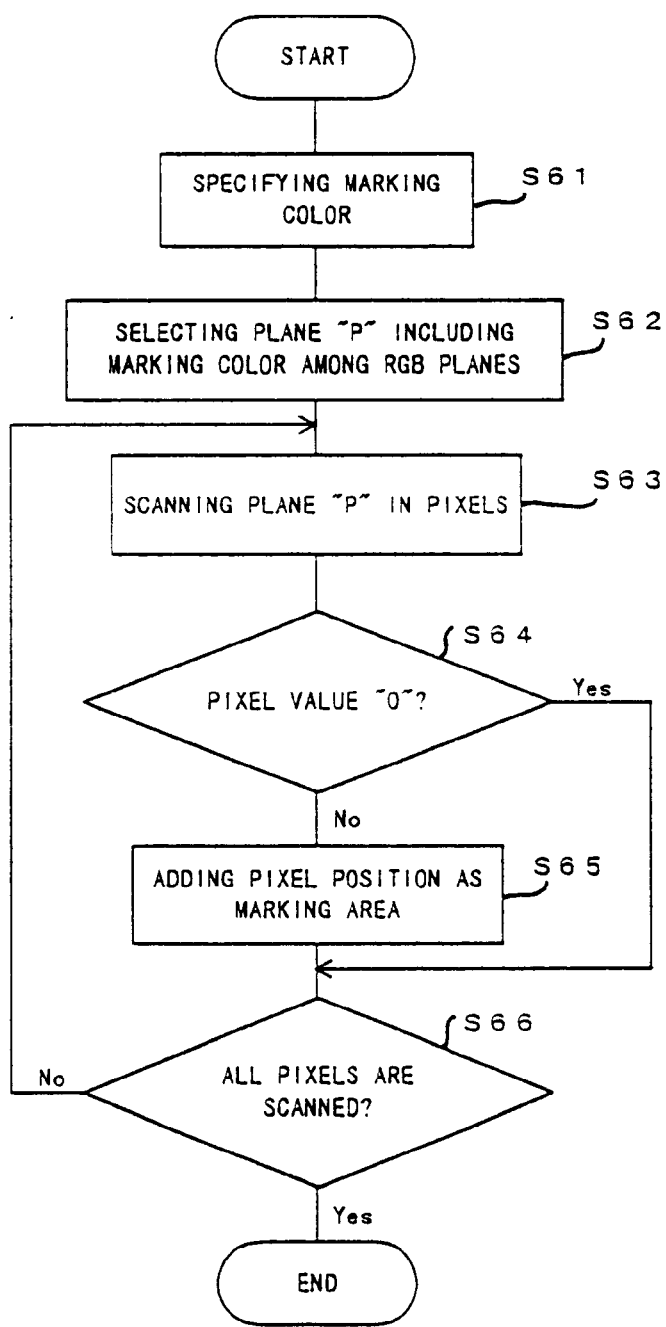
FIG. 27 is a flowchart showing a marked area detection process performed by a color detecting unit.

FIG. 27 is a flowchart showing the process for detecting a marked area, which is performed by the color detecting unit 42. Once the process is started in this figure, a marking color is first specified in step S61. In step S62, a plane "P" including the marking color is selected from RGB (Red, Green, and Blue) planes. Assuming that the marking color is green, the G plane is selected as the plane "P".

In step S63, the pixels of the selected plane "P" is scanned one by one. In step S64, it is determined whether or not the value of each of the pixels is "0". If "NO", the position of the pixel is added as a constituent element of the marked area in step S65. If "YES" in step S64, it is determined whether or not the scanning is performed for all of the pixels in step S66 without performing step S65. If "YES" in step S66, the process is terminated. If "NO", the process in and after step S63 is repeatedly performed.

Figure 29:
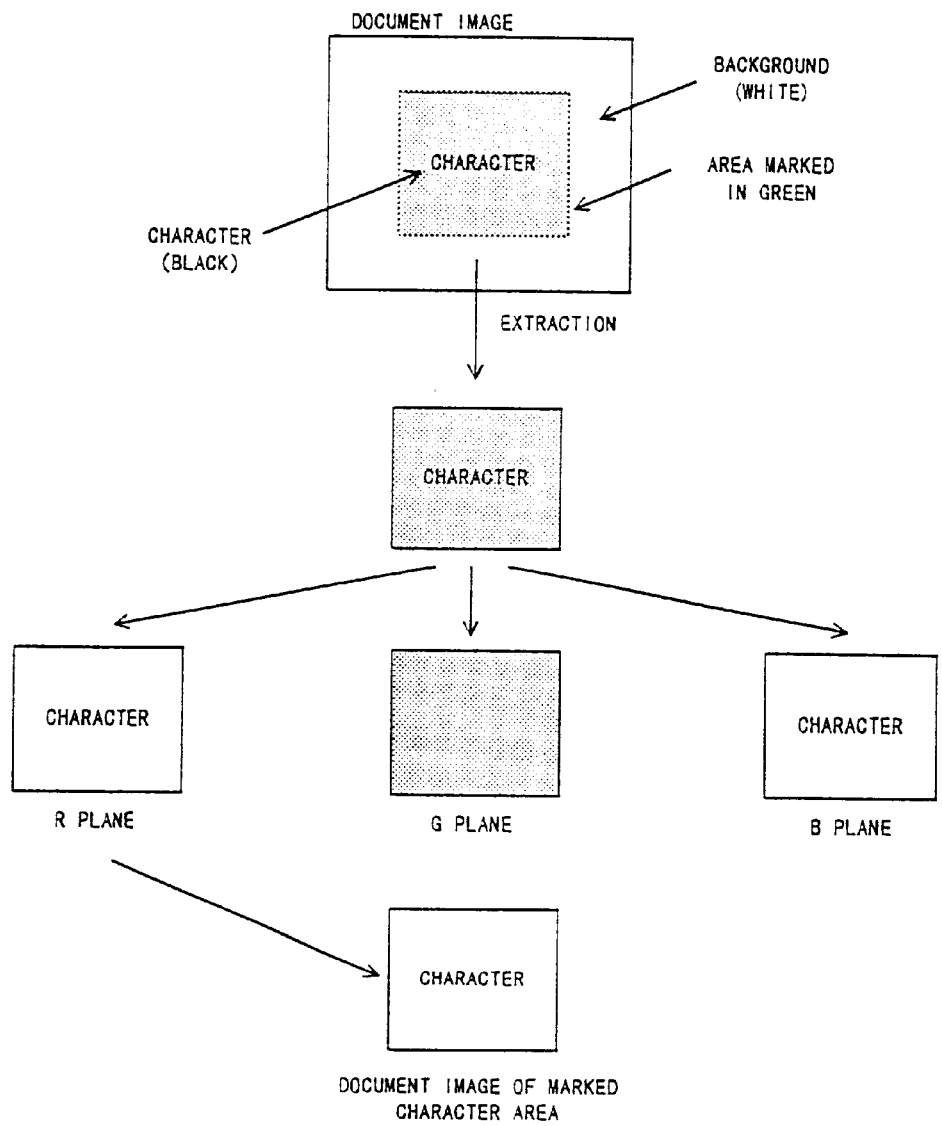
FIG. 29 is a schematic diagram explaining a second method for erasing a marking color.

FIGS. 28 and 29 are schematic diagrams explaining a method for erasing a marking color, which is performed by the color erasing unit 44. FIG. 28 is a schematic diagram explaining a first method based on the assumption that the background of a document image is white, and the characters are black and marked in green. The area marked in green is extracted. A logical operation such as a logical AND operation is performed for each pixel value of each of the R, G, and B planes in the extracted area, so that the black pixels of the characters are left unchanged, and the background color can be changed from green, the marking color to white.

FIG. 29 is a schematic diagram explaining the second method for erasing a marking color. Unlike the first method, only the pixel values of the R plane for the extracted marked area are output as a partial image in this figure. Therefore, only the black character portion is left in the partial image. As a matter of course, the method for extracting a marked area and the method for erasing a marking color are not limited to such methods.

Figure 30A:
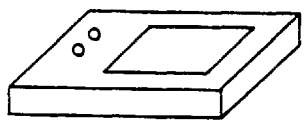
FIGS. 30A and 30B exemplify the external views of a portable information device.
Figure 30B:
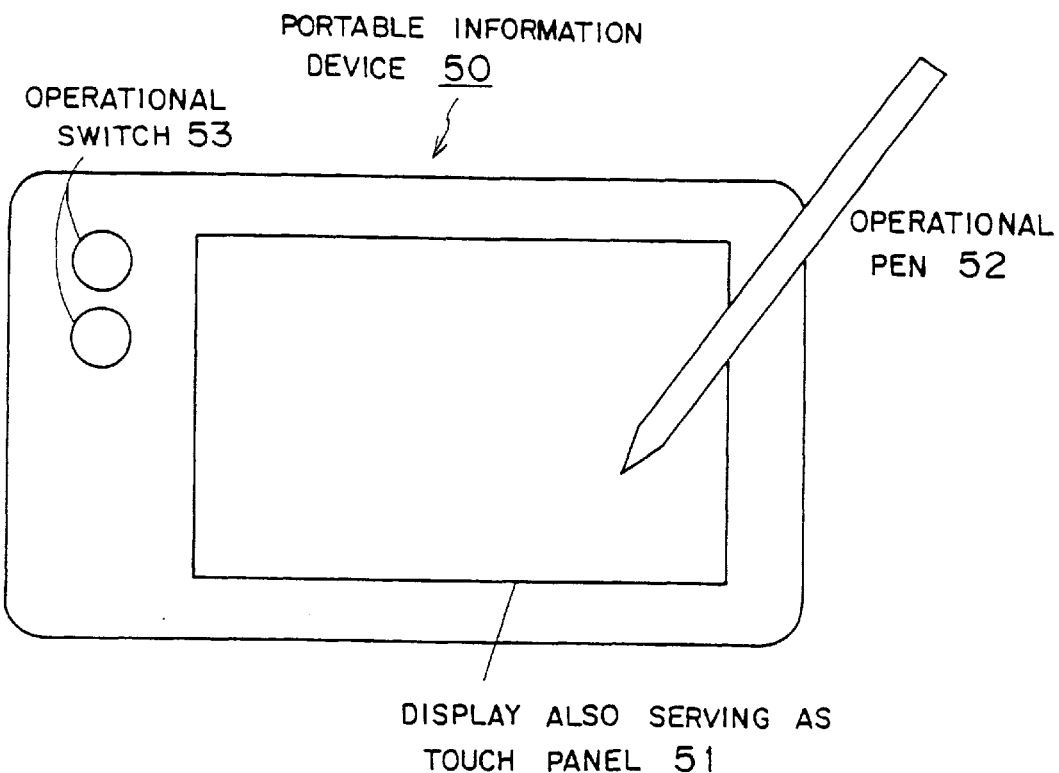

Provided next is the explanation about the example of a device to which the document image display method according to the present invention is applied, and its actual operations, by referring to FIGS. 30A, 30B, and 31.

FIGS. 30A and 30B show the external views of a portable information device as an example of the device to which the above described document image display method is applied. FIG. 30A shows the view diagonally seen from the top, while FIG. 30B shows top view.

In FIG. 30B, a portable information device 50 comprises at least a display also serving as a touch panel 51, an operational pen 52, an operational switch 53, etc. A user, etc. performs an input/instruction operation by touching an arbitrary position (such as the position at which the operational button 53 is displayed, etc.) on the display also serving as the touch panel 51 with the point of the operational pen 52. Or, the user may issue a desired instruction by using the operational switch 53.

FIG. 31 exemplifies the operations performed by the above described portable information device 50.

With the device to which the document image display method according to the present invention is applied, a user, etc. can freely display partial images in various forms with simple operations as shown in this figure.

In FIG. 31, for example, (a) the partial images are selected, for example, by touching the display positions (four positions in this figure) of desired partial images with the operational pen 52 on the display screen (display also serving as the touch panel 51) where the images shown in FIG. 19 appear. Then, the erasing instruction is issued, for example, by operating the operational switch 53 for the erasing instruction, or by touching an instructing button displayed on the touch panel 51, so that (b) the selected partial images are erased. Furthermore, (c) a desired partial image is moved to a desired position using the operational pen 52, for example, by issuing an instruction for moving a partial image, etc. Next, (d) the partial image to be changed is specified with the operational pen 52 by performing an operation for instructing a reduction ratio to change, so that the display reduction ratio of the partial image data (shown in FIG. 10C) of the selected partial image is changed and the partial image is displayed. In the case of (e) in FIG. 31, the specified partial image is enlarged and displayed.

Figure 32:
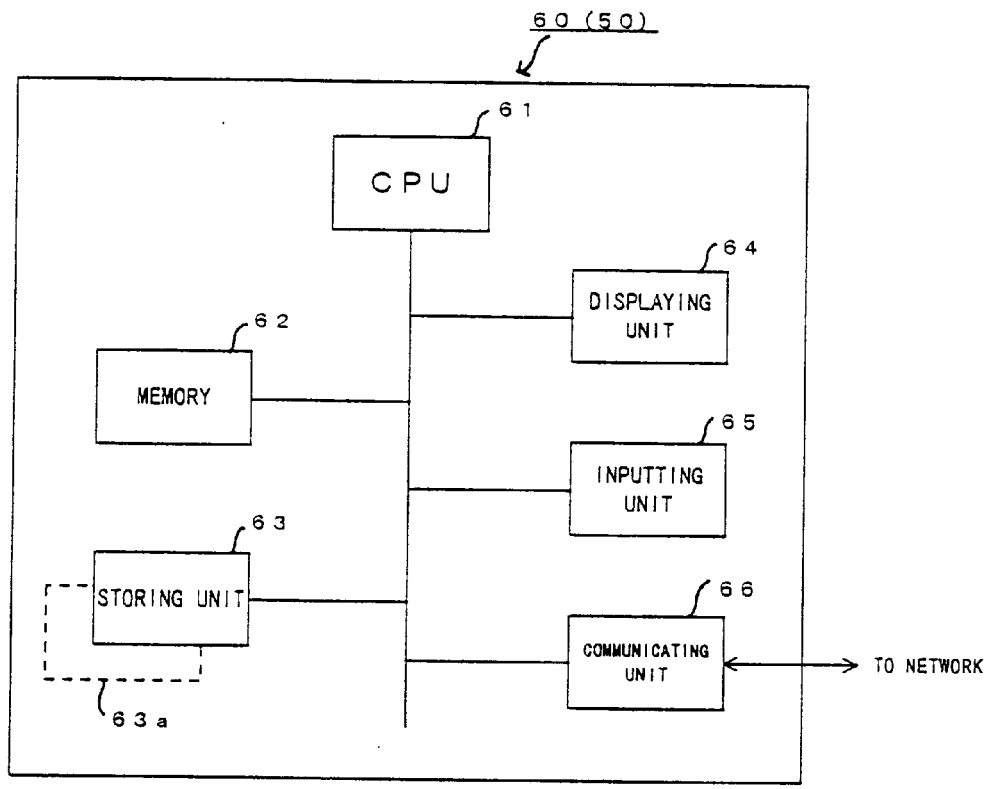
FIG. 32 is a block diagram exemplifying the hardware configuration of the portable information device.

FIG. 32 is a block diagram exemplifying the hardware configuration of the portable information device 50 shown in FIGS. 30A and 30B.

In this figure, a device 60 (portable information device 50) comprises a CPU 61, a memory 62, a storing unit 63, a display unit 64, an inputting unit 65, a communicating unit 66, etc. Because these constituent elements are general, their details are omitted here. The document image display method according to the present invention is implemented, for example, by that the CPU 61 reads and executes the program stored in the memory 62 or the storing unit 63. The storing unit 63 may be a ROM, RAM, or a flash memory, etc. in which the above described program is stored, or may be a portable storage medium 63a such as an IC card, a memory card, a floppy disk, etc. onto which the above described program is stored. Additionally, the communicating unit 66 may download the above described program from another device via a network such as the Internet, a LAN, a pay phone line, etc., so that the above described display method can be implemented.

Provided last is the explanation about how to load a program into a computer system as a display device for implementing the document image display method according to the present invention, by referring to FIG. 33. In this figure, a computer 71 comprises a main body 74 and a memory 75. Into the main body 74, a program, etc. can be loaded from a portable storage medium 72, or from a program provider via a network 73.

The programs recited in claims 19 and 20 according to the present invention represented as the flowcharts shown in FIGS. 11 through 15, 18, and 27 are stored, for example, in the memory 75 shown in FIG. 33, and these programs are developed and executed in a main memory which is not shown in this figure in the main body 74. Here, a random access memory (RAM), or a hard disk is used as the memory 75.

Furthermore, a document image can be displayed by storing a program for extracting a partial image from the document image, storing and displaying the partial image, onto a portable storage medium, and loading the program into the computer 71. As the portable storage medium 72, an arbitrary storage medium which is marketed and can be distributed, such as a memory card, a floppy disk, a CD-ROM (Compact Disk-Read Only Memory), an optical disk, a magneto-optical disk, etc., can be used. Still further, a program for displaying a document image, etc. is transmitted from a program provider to the computer 71 via the network 73, and the program is loaded, so that the document image can be displayed.

As described above, according to the present invention, a document image is structurized and respective divided areas are extracted as partial images, so that the partial images for one document are stored as one file.

As described above in detail, according to the present invention, an input document image is structurized, and respective divided areas are extracted as partial images, and only a necessary image is reduced or relocated among the extracted partial images, so that more of a desired portion of a high-resolution document image can be displayed and can be made easy to view. As a result, it greatly contributes to improving the practical use of an image information device.

What is claimed is:

1. A document image display method, comprising:
   a partial image extracting step for structurizing a document image as a display target by dividing the document image into areas according to editable content attributes, and extracting respective structured areas as partial images;
   an image storing step for storing the partial images extracted from one document in said partial image extracting step as one file;
   a data reading step for selecting and reading the partial image stored as one file in said image storing step; and
   an image displaying step for independently displaying each partial image read in said data reading step; wherein:
      said partial image extracting step assigns priorities to the partial images and their area sizes for displaying according to attributes of the extracted partial images;
      said image storing steps stores data of the priorities assigned to the partial images together with the partial images; and
      a priority corresponds to a specified attribute.

2. A document image display method, comprising:
   a partial image extracting step for structurizing a document image as a display target by dividing the document image into areas according to editable content attributes, and extracting respective structured areas as partial images; and
   an image storing step for storing the partial images extracted from one document in said partial image extracting step as one file; wherein
      said partial image extracting step assigns priorities to the partial images and their area sizes for displaying according to attributes of the extracted partial images;
      said partial image extracting step extracts an area colored in a particular color by a marking tool among the structurized areas on a sheet of paper as a partial image, said partial image extracting step comprising:
         a color detecting step for scanning the area colored in the particular color by the marking tool, in which a background of the marked area of input document image is colored with the marked particular color, and for extracting the area colored with the marked particular color;
         a color erasing step for erasing the marked particular color from the extracted area colored with the marked particular color and outputting the image as the partial image; and
         a priority corresponds to a specified attribute.

3. A document image display method, comprising:
   a partial image extracting step for structurizing a document image as a display target by dividing the document image into areas according to editable content attributes, and extracting respective structured areas as partial images;
   an image storing step for storing the partial images extracted from one document in said image extracting step as one file;
   a data reading step for selectively reading a partial image stored as one file in said image step; and
   an image displaying step for independently displaying each partial image read in said data step, wherein:
      said partial image extracting step assigns priorities to the partial images and their area sizes for displaying according to of the extracted partial images;

said image storing steps stores data of the priorities assigned to the partial images together with the partial images;

said data image reading step selectively reads a partial image assigned with a specified based on the priorities assigned to the images; and a priority corresponds to a specified attribute.

4. The document image display method according to claim 3, wherein said data reading step selects and reads a partial image according to a particular attribute.

5. The document image display method according to claim 3, wherein said image displaying step displays the partial images by reducing an empty space between partial images and relocating the partial images in order to be able to display more partial images.

6. The document image display method according to claim 3, wherein said image displaying step erases a display of a partial image to which an instruction is issued in correspondence with the instruction issued from an outside.

7. The document image display method according to claim 3, wherein said partial image extracting step extracts only a partial area instructed from an outside or an area according to an attribute instructed from the outside, as a partial image.

8. The document image display method according to claim 3, wherein said image storing step compresses data of a partial image extracted in said image extracting step, stores the compressed data, decompresses the compressed data to the partial image when reading the stored partial image, and outputs the restored partial image.

9. The document image display method according to claim 8, wherein said image storing step compresses the data of the partial image by switching a compression method depending on whether characters are either in vertical writing or in horizontal writing if the attribute of the partial image is a character attribute, at the time of compressing the data of the partial image.

10. The document image display method according to claim 8, wherein said image storing step performs data compression in each of a plurality of stages after reducing the partial image at the plurality of stages when compressing the data of the partial image, stores the compressed data, decompresses the compressed image to a reduced image at a specified stage when reading the stored partial image, and outputs the decompressed image as a partial image.

11. The document image display method according to claim 8, wherein said partial image extracting step assigns a priority to the partial image according to an attribute of the partial image or in correspondence with an instruction issued from the outside; and said image storing step performs data compression in each of a plurality of stages after reducing the partial image at the plurality of stages when compressing the data of the partial image, stores the compressed data together with data of the assigned priority, decompresses the compressed image to a reduced image at a stage according to the priority assigned to the partial image when reading the stored partial image, and outputs the decompressed image as a partial image.

12. A document image display device for displaying a document image, comprising:

partial image extracting means for structurizing a document image as a display target by dividing the document image into areas according to editable content attributes, and extracting respective structurized areas as partial images;

image storing means for storing the partial image extracted from one document by said partial image extracting means, as one file data reading means for selecting and reading the partial image stored by said image storing means as one file; and image displaying means for independently displaying each partial image read by said data reading means, wherein:

said partial image extracting means assigns priorities to the partial images and their area sizes for display according to attributes of the extracted partial images;

said image storing means stores data of the priorities assigned to the partial images together with the partial images;

said data image reading means selectively reads a partial image assigned with a specified priority based on the priorities assigned to the partial images; and a priority corresponds to a specified attribute.

13. A computer readable storage medium in order to display document image, for storing a program which includes the functions of:

structurizing the document image as a display target by dividing the document image into areas according to editable content attributes, and extracting respective structurized areas as partial images; and storing each partial image extracted from among document as one file, wherein selecting and reading each partial image stored as one file;

independently displaying each read partial image;

assigning priorities to the partial images and their area sizes for displaying according to attributes of the extracted partial images;

storing data of the priorities assigned to the partial images together with the partial images;

selectively reading a partial image assigned with a specified priority based on the priorities assigned to the partial images; and a priority corresponds to a specified attribute.

14. A document image display device for displaying a document image, comprising:

a partial image extracting unit structurizing a document image as a display target by dividing the document image into areas according to editable content attributes, and extracting respective structurized areas as partial images;

an image storing unit storing the partial image extracted from one document by said partial image extracting unit, as one file;

a data reading means for selecting and reading the partial image stored by said image storing unit as one file; and an image displaying unit independently displaying each partial image read by said data reading unit, wherein:

said partial image extracting unit assigns priorities to the partial images and their area sizes for displaying according to attributes of the extracted partial images;

said image storing unit stores data of the priorities assigned to the partial images together with the partial images;

said data image reading unit selectively reads a partial image assigned with a specified priority based on the priorities assigned to the partial images; and a priority corresponds to a specified attribute.

* * * * *